C. R. MARTINEAU.
MECHANICAL ADDING DEVICE.
APPLICATION FILED MAY 23, 1906.

1,324,460.

Patented Dec. 9, 1919.
13 SHEETS—SHEET 2.

C. R. MARTINEAU.
MECHANICAL ADDING DEVICE.
APPLICATION FILED MAY 23, 1906.
1,324,460.
Patented Dec. 9, 1919.
13 SHEETS—SHEET 3.
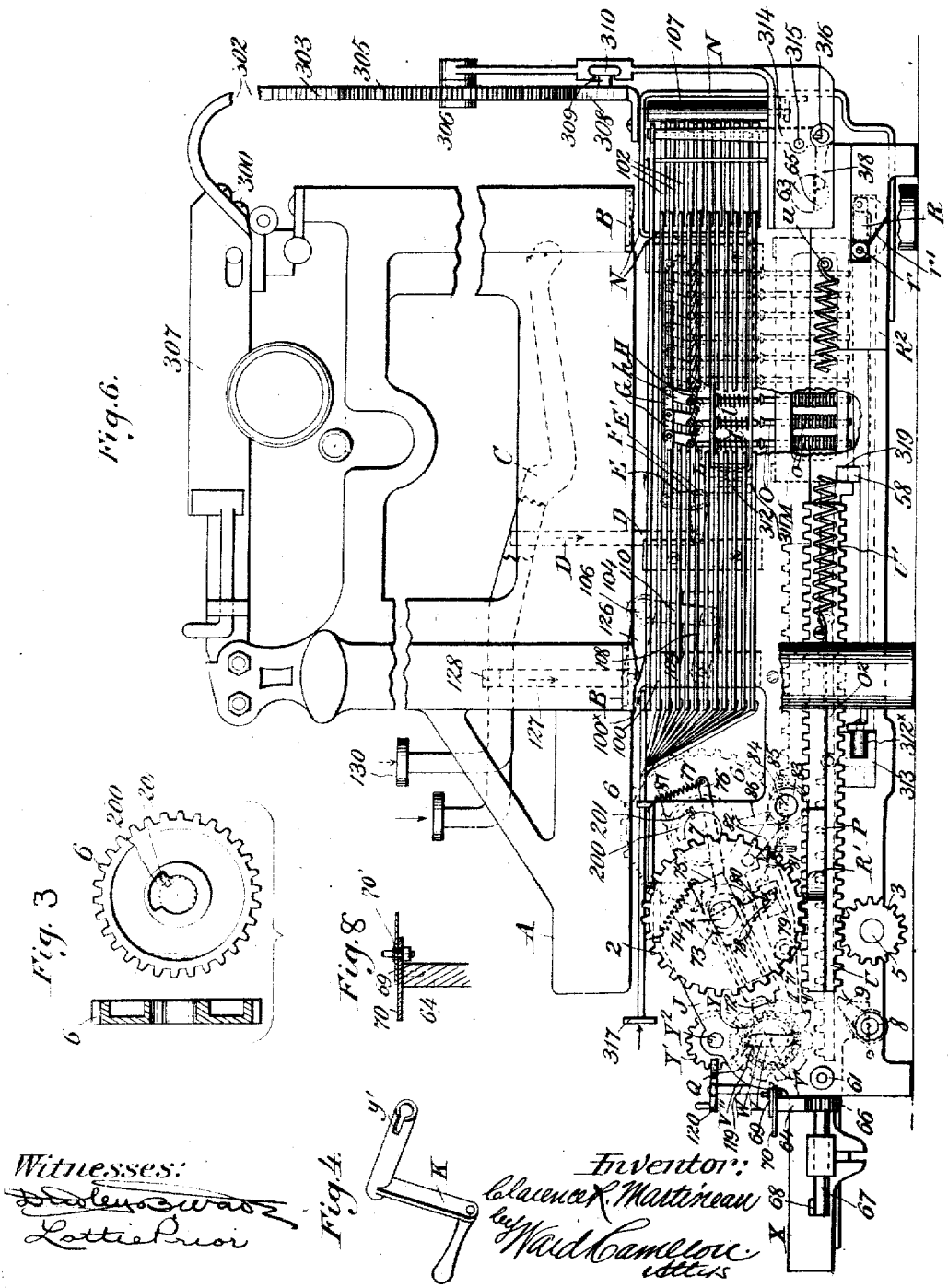

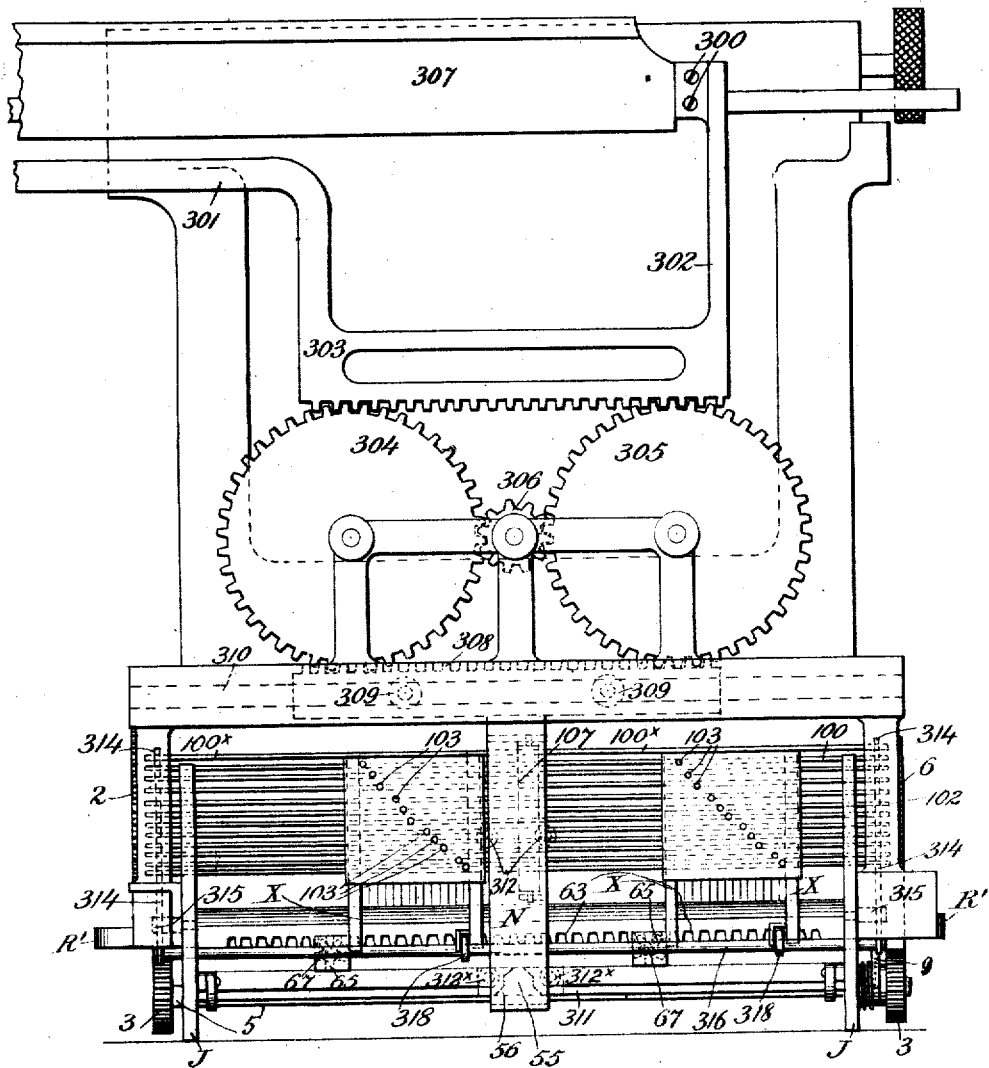

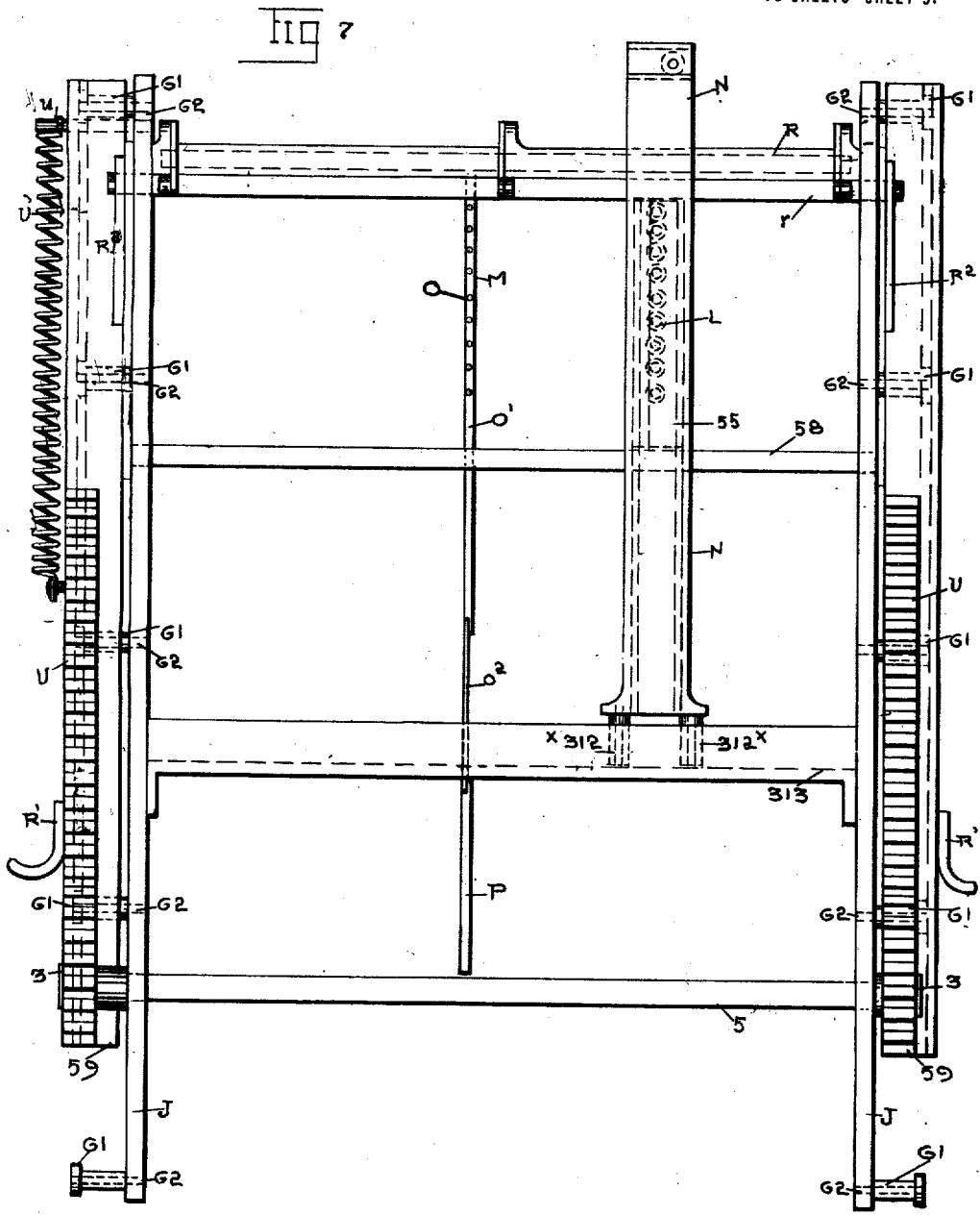

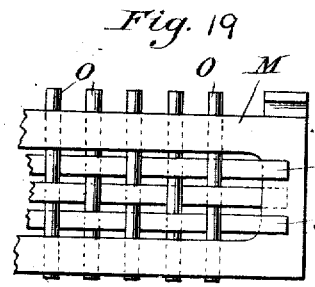
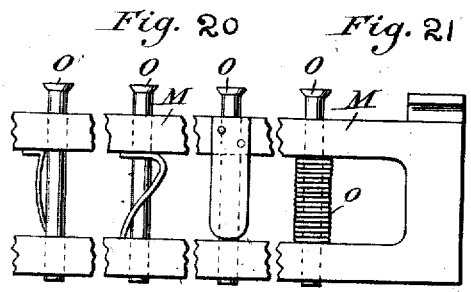
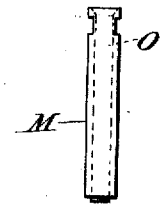
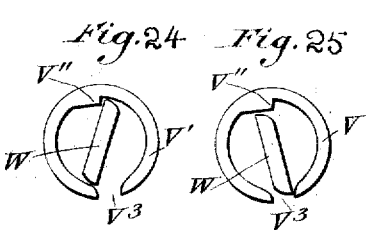
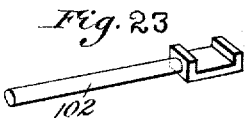
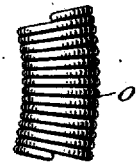
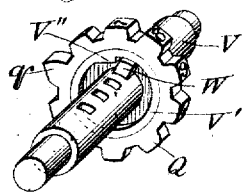
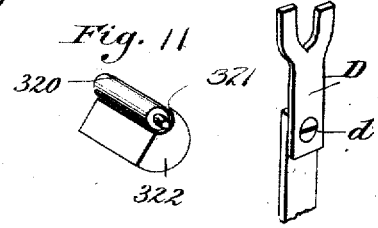
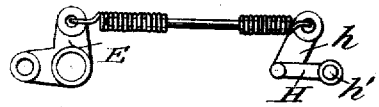
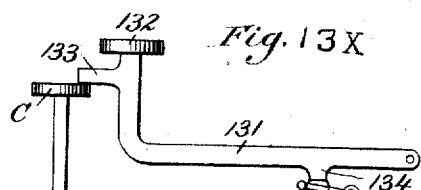
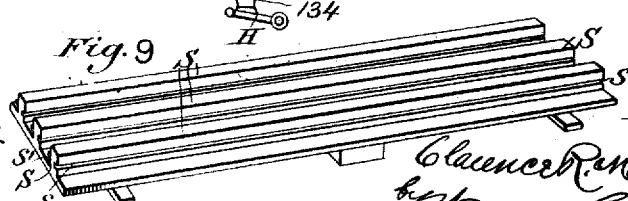

C. R. MARTINEAU.
MECHANICAL ADDING DEVICE.
APPLICATION FILED MAY 23, 1906.
1,324,460.
Patented Dec. 9, 1919.
13 SHEETS—SHEET 7.
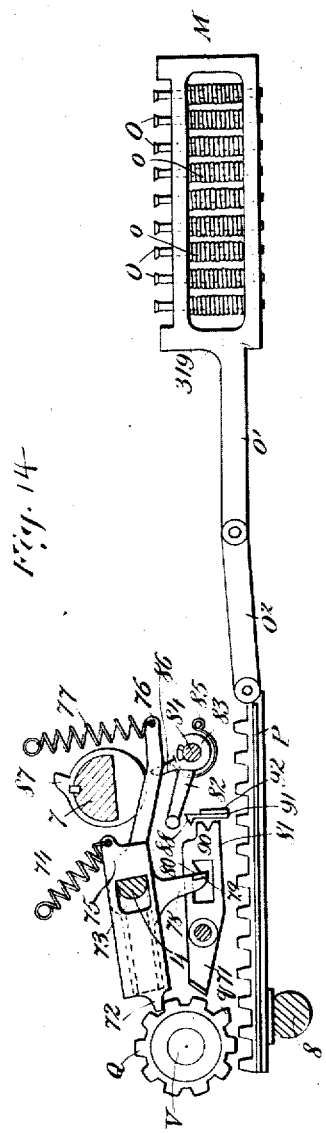
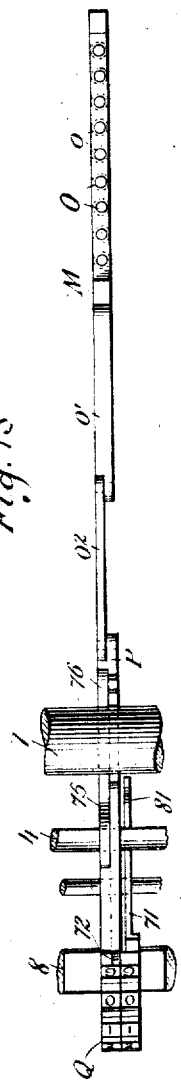
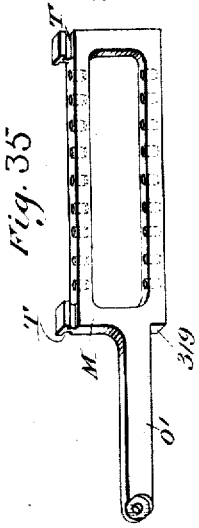
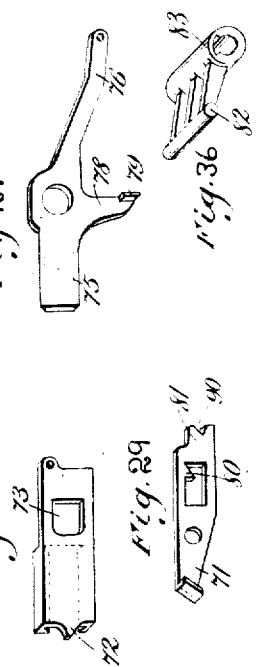

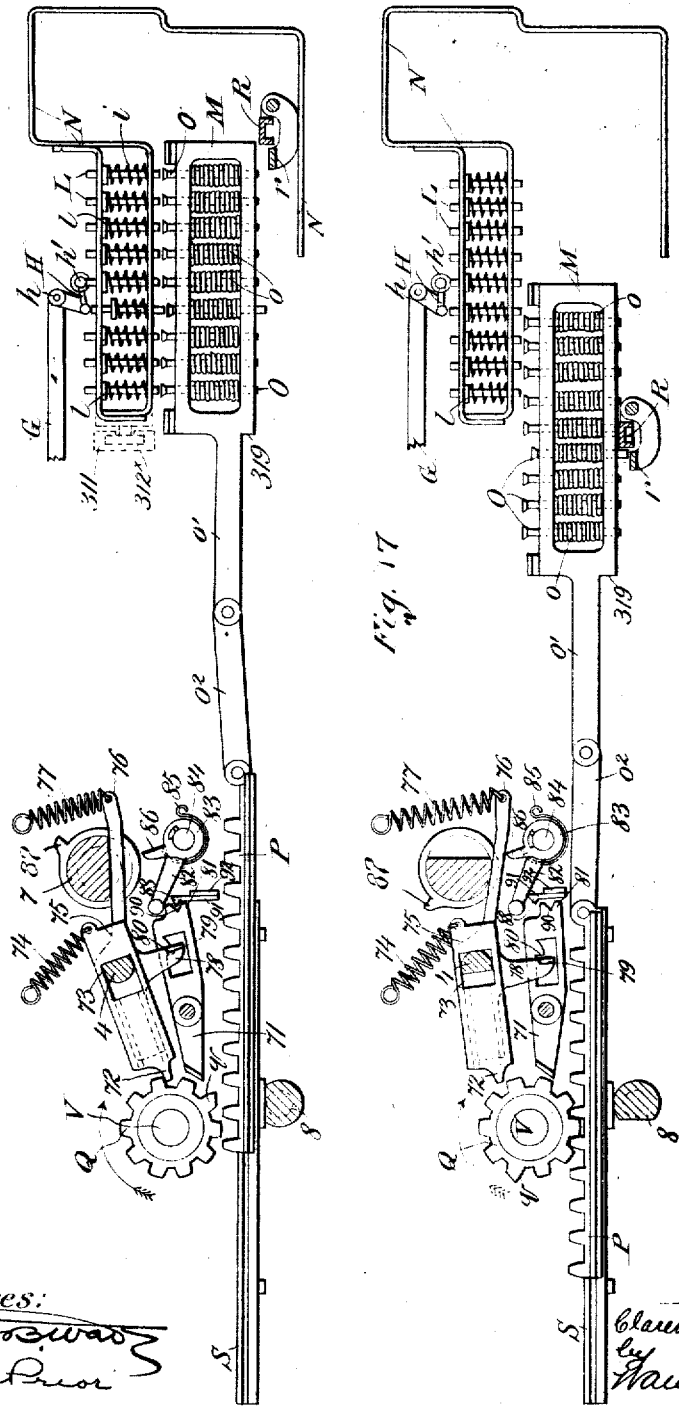

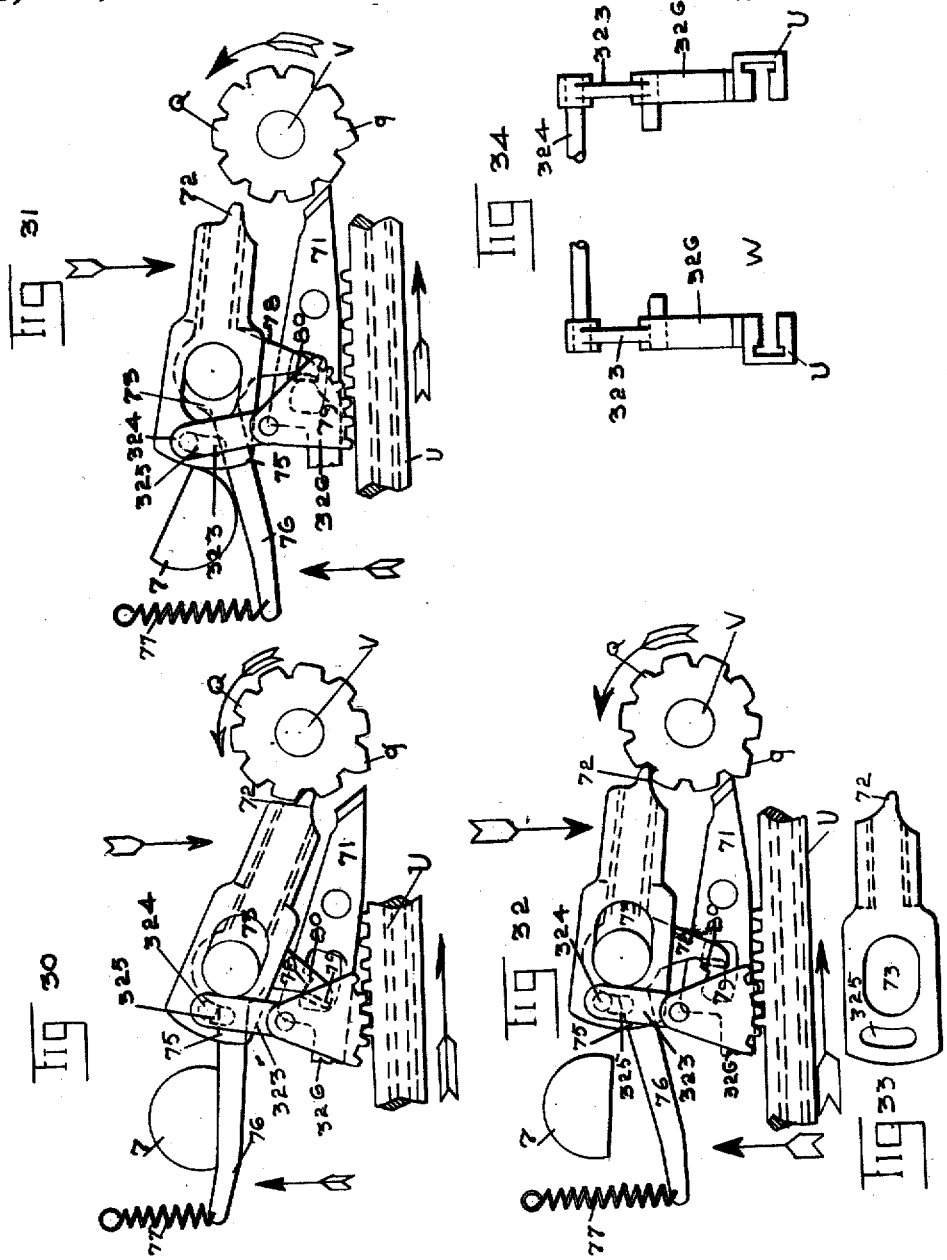

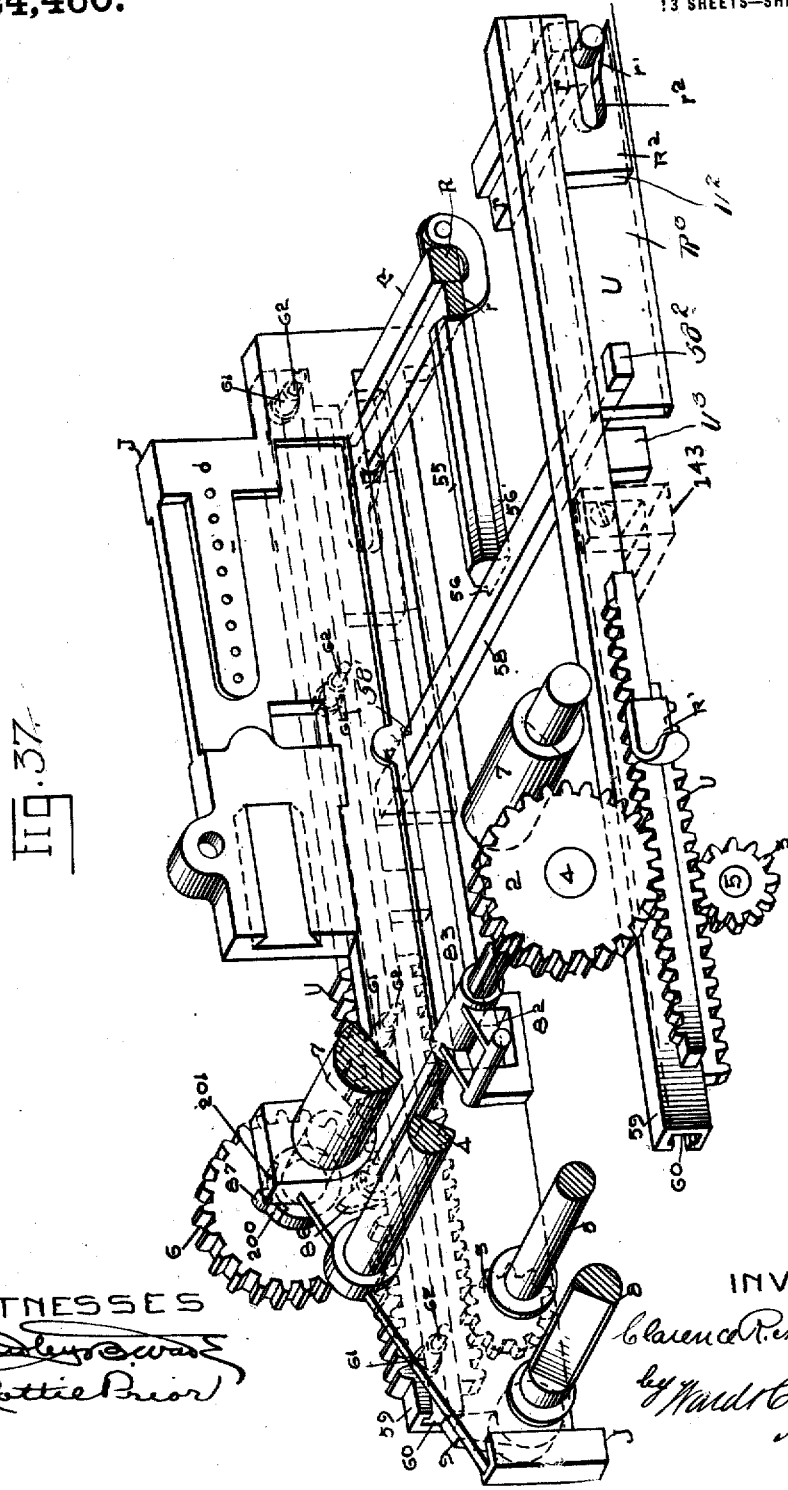

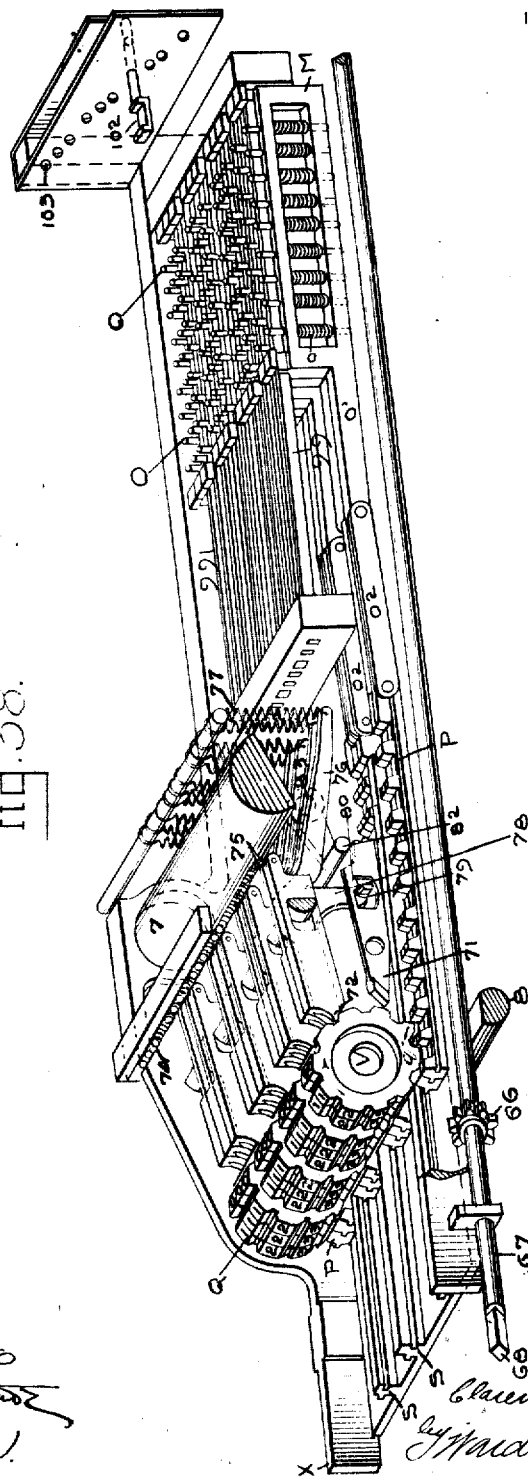

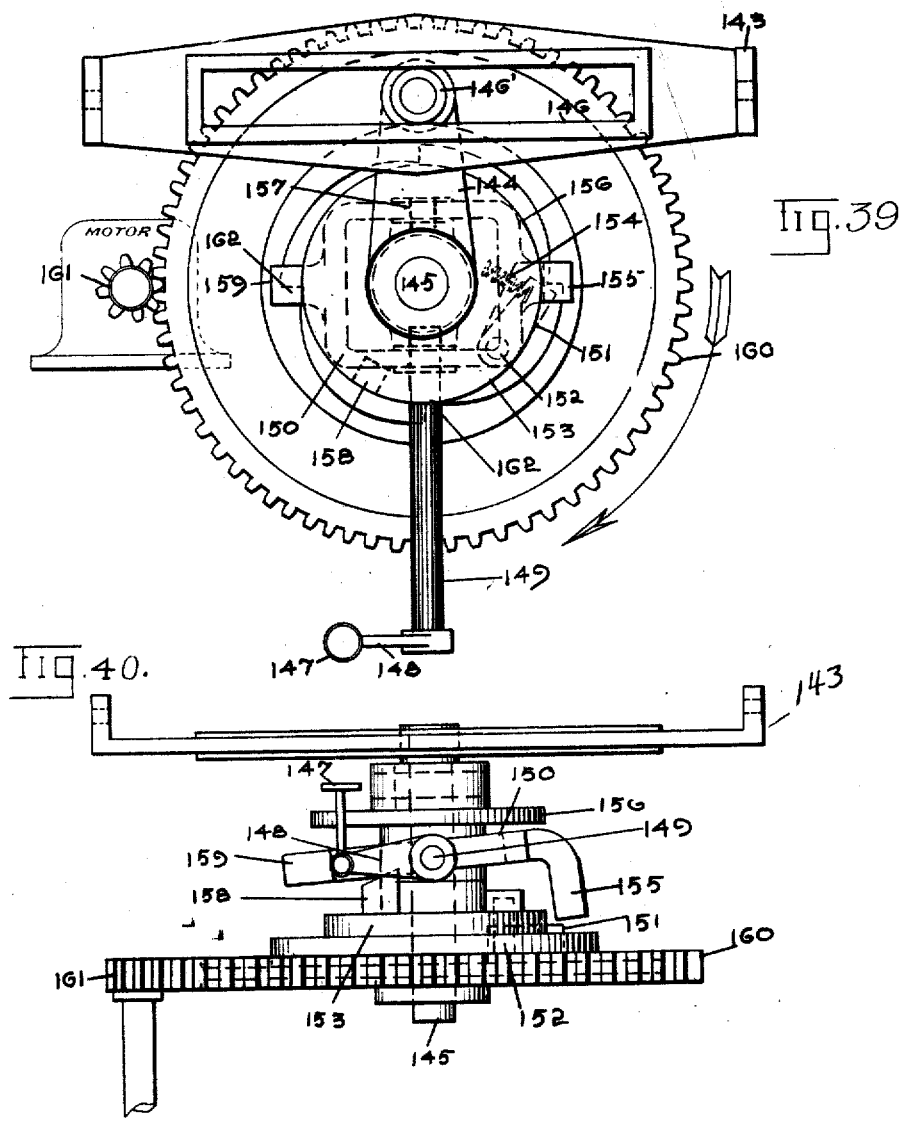

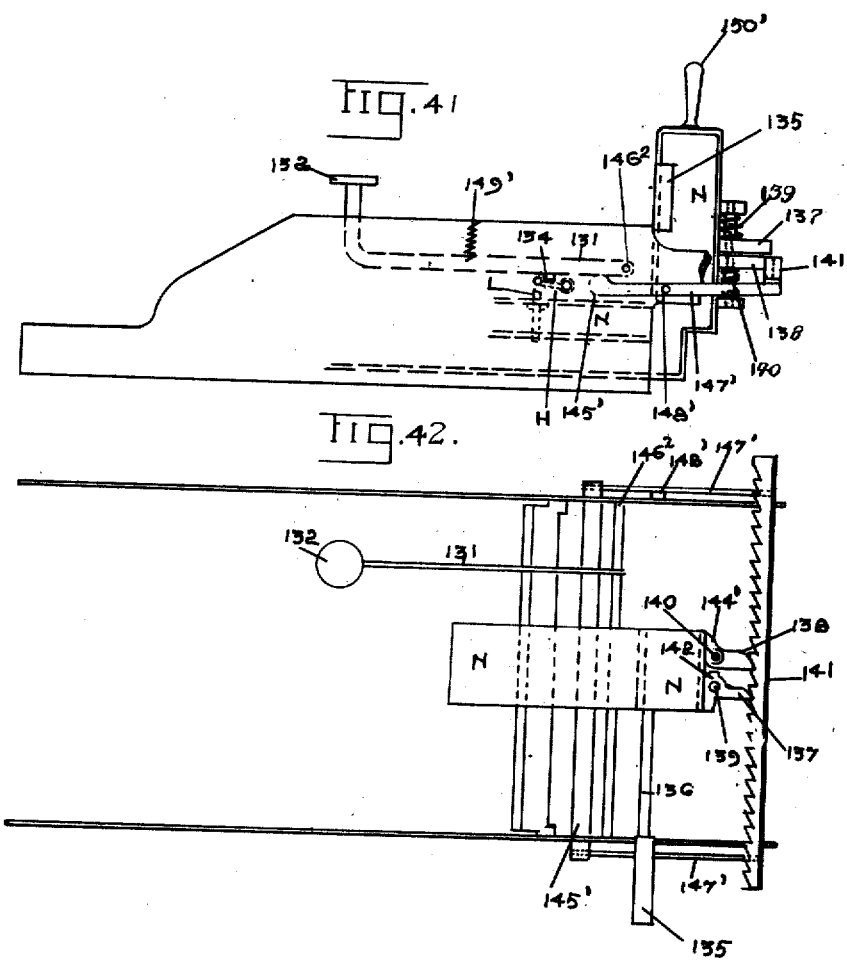

UNITED STATES PATENT OFFICE.

CLARENCE R. MARTINEAU, OF SLINGERLANDS, NEW YORK, ASSIGNOR, BY MESNE ASSIGNMENTS, TO JOHN T. UNDERWOOD, OF BROOKLYN, NEW YORK.

MECHANICAL ADDING DEVICE.

1,324,460.   Specification of Letters Patent.   Patented Dec. 9, 1919.

Application filed May 23, 1906. Serial No. 318,400.

*To all whom it may concern:*

Be it known that I, CLARENCE R. MARTINEAU, a citizen of the United States, residing at Slingerlands, in the county of Albany and State of New York, have invented certain new and useful Improvements in Mechanical Adding Devices, of which the following is a specification.

My invention relates to devices for mechanically adding figures placed upon a paper by a typewriting machine, and for producing and indicating the footing or footings in such manner that the operator can see and copy the same upon the paper.

The application of the typewriting machine to the adding device, in such a manner that it may be removed when desired and another typewriting machine of different make substituted therefor, forms a part of my invention.

Of the many objects of my invention, attention is especially directed to the following:

1st: To provide an improved adding device which may be used in connection with a typewriting machine, whereby the footing or footings of one or more sets of figures written on the typewriting machine shall be mechanically displayed in such a position that the operator may copy the same upon the paper.

2nd: To provide an improved adding device adapted to be used with a typewriting machine, in which the number keys of the typewriting machine, when operated upon, will mechanically operate the adding apparatus, and the addition or additions made will be displayed to the operator.

3rd: The production of an improved adding device adapted to be connected with a typewriting machine, in which the adding wheels and connections may be moved laterally across the machine, Figs. 1, 2 and 6, in such a manner that the figures to be added may be placed in such column or position on the paper as may be desired.

4th: The production of an improved adding device whereby the key connections between the adding bars, D, and the typewriter levers, C, Fig. 6, may be broken by mechanism controlled by a throw-out key 317, so as to permit operation of the typewriter, independently of the adder, or so that the adding machine may be operated by an independent set of numeral keys, 132.

5th: To produce a tabulating device in connection with an adding machine, whereby the columns of figures to be added may be placed on the paper in any position desired by the operator without the operator having to shift its position on the platen of the typewriting machine, Figs. 1 and 6.

6th: To provide an improved adding device which may be operated by hand or electrically driven.

7th: To provide an improved adding machine which may be operated independently of the typewriter.

Together with such other elements and combinations as are hereinafter more particularly set forth.

I accomplish these objects by means of the mechanism illustrated in the accompanying drawings, in which:

Fig. 3 is a plan and section of a gear 6. (Sheet four.)

Fig. 4 is a perspective view of a zero setting key, K.

Fig. 5 is a rear elevation of the machine. (Sheet three.)

Fig. 6 is a side elevation thereof, parts being omitted.

Fig. 7 is a reverse plan view of the bottom of the machine.

Fig. 8 is a section, with parts broken away, through a rack, 64, showing an indicator, 69, and means for retaining the same in a slot 70'. (Sheet four.)

Fig. 9 is a perspective view of a rack carrier or guide in which racks, P, are movable. (Sheet six.)

Fig. 10 is a detail view of a connecting bar, D, having a U-shaped upper end.

Fig. 11 is a modified perspective view of an anti-friction device.

Fig. 12 is a side elevation of a device for cushioning key stroke.

Fig. 13 is an end view of the rack carrier.

Figure 1:
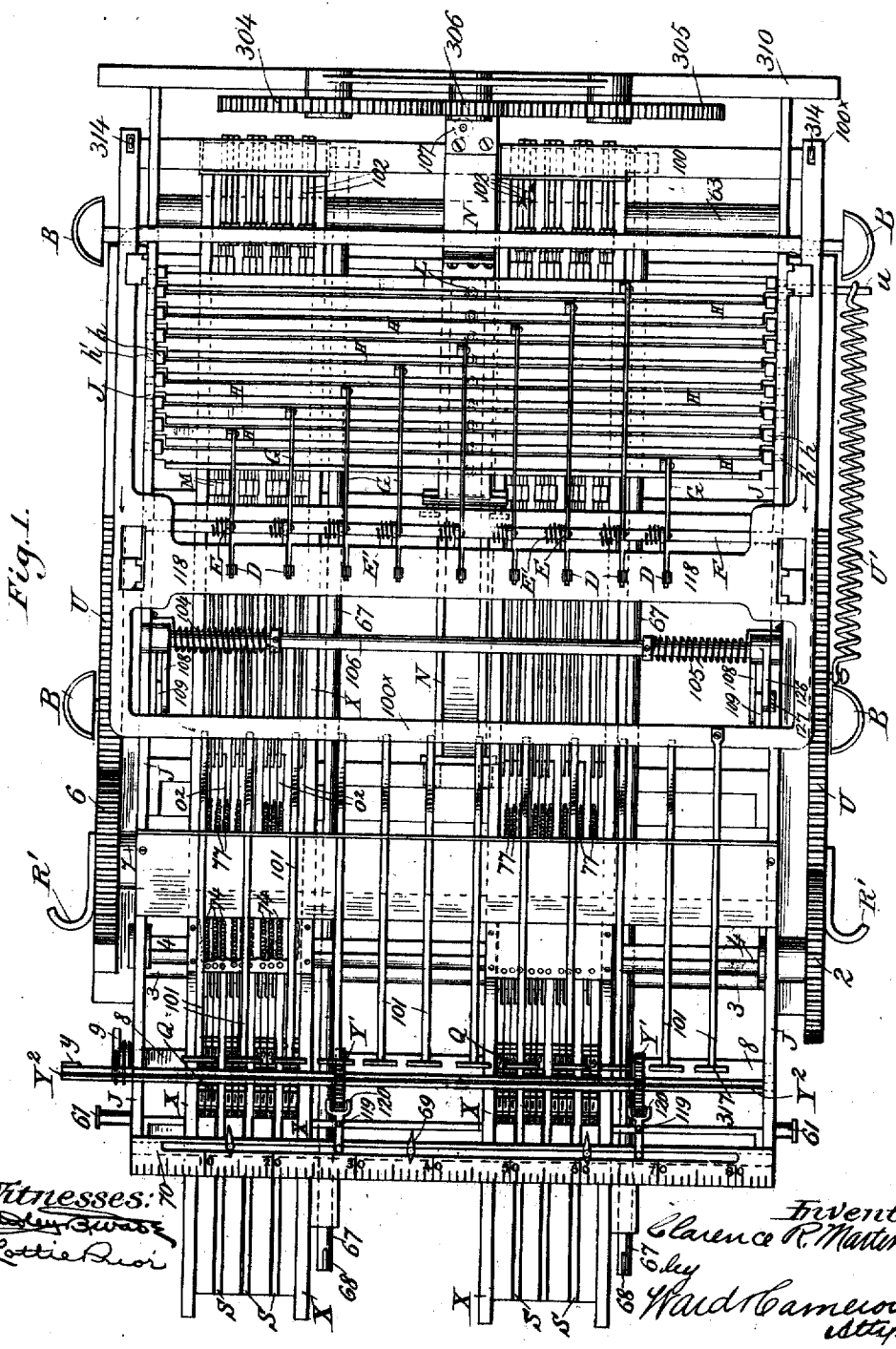
Figure 1 is a plan of the adding or computing device.

Fig. 13˟ is a view showing a modified form of key connection between an adding device key and a typewriter key.

Figs. 14 (Sheet seven), 16 and 17 (Sheet eight) are side views of different positions of the carry mechanism, Fig. 15 is a plan of the carry mechanism shown in Fig. 14.

Fig. 18 shows a friction spring in elevation. (Sheet six.)

Figs. 19, 20 and 21 are side views of one of the pin frames, M, showing different friction devices for holding pins, O, in position.

Fig. 22 is an end view of a pin frame, M.

Fig. 23 is a perspective view of a denominational stop, 102, of the tabulating device.

Figs. 24 and 25 are side views of portions V', V², and W, shown in perspective in connection with an adding wheel in Fig. 26, and showing the different positions of the parts in the operation of the adding wheel.

Fig. 26 is a perspective view of an adding wheel, Q, and shaft, V.

Fig. 27 is a perspective view of a bar, 75, having an arm, 76, and projections, 78 and 79. (Sheet seven.)

Fig. 28 is a perspective view of a locking point, 72, having a slot 73, therein.

Fig. 29 is a perspective view of a latch, 71, having a locking device, 80, a lug, 81, and an indentation, 90.

Figs. 30, 31, 32, 33 and 34 are views showing a modified form of "carry" mechanism doing away with the springs 74.

Fig. 35 is a perspective view of a pin frame, M.

Fig. 36 is a perspective of a guard, 82, with its sleeve, 83.

Fig. 37 is a perspective view, showing one of the frames of the machine, J, a driving bar, R, to operate the pin frames, M, a pin restoring bar, R, a beveled error bar, 55, a pin frame restoring bar, 58, flattened shafts, gears and guard 82, to aid in the carry operation, and an operating rack bar, U, with hook, R', attached.

Fig. 38 is a perspective of a movable nest carrying adding wheels and connections.

Fig. 39 is a plan of an electrical drive mechanism.

Fig. 40 is an end elevation of Fig. 39.

Fig. 41 is a side elevation of a modified form of computing device, including escapement mechanism.

Fig. 42 is a plan of the escapement mechanism shown in Fig. 41.

Similar letters refer to similar parts throughout the several views.

I preferably mount the parts of my adding device in a suitable frame and secure the typewriting machine to the top of the same, by means of suitable supports attached to or forming part of said frame, upon which the feet of the typewriter rest, and to which they may be readily secured. I provide a series of vertical bars which may be placed in positions to be engaged and moved by those typewriter bars which carry the number printing types. These vertical bars are connected with mechanism through which, when operated, they will tend to provide for the proper degree of rotation of the adding wheels, when movement is given to the adding mechanism by means hereinafter particularly set forth.

In order that the typewriting machine and the adding device shall act in unison, I connect the carriage of the typewriting machine to a series of gears which mesh with the rack to which is attached the adding machine carriage carrying the tabulating stop, 107, Fig. 6, of the adding mechanism. Of course, in operating a typewriter in which the carriage moves from right to left it is necessary, in order that the tabulations of the adding machine shall be the same as the writing on the paper, that the carriage of the adding machine should move from left to right, directly opposite to the direction of the movement of the typewriting machine carriage. This is provided for in my machine by connecting the carriage of the typewriting machine with a rack engaging the top of two gears moving in the same direction, and the bottom of said gears engaging with the rack attached to the carriage of the adding machine.

The adding wheels are preferably mounted near the front of the machine, where they can be readily seen by the operator, and have the figures from zero to nine arranged upon projections, preferably, on the peripheries of the wheels, respectively. The wheels are, preferably, spaced for dollars, cents, thousands, etc., and they are set in motion by a series of racks engaging them. The limit of their motion is determined by the position of pins carried by a frame attached to each rack, respectively, so that when one of the pins is depressed, the rack engaging with its adding wheel can only move a distance depending upon the position of that pin in the frame.

I will now proceed to more particularly describe my machine and its connections in reference to the drawings.

A typewriting machine, A, rests upon the posts, B, B, and is secured thereto in any suitable manner. The typewriter type-bar levers, C, which carry the number printing types, engage with the vertical bars, D, and rest in U-shaped yokes in their tops, see Figs. 6 and 10. There would, therefore, be preferably nine bars, D, extending across the machine, and I preferably make the bar, D, in two parts, as shown in Fig. 10, in which the U-shaped portion is attached by means of a suitable screw, d, to the lower part of the bar, the opening in the U-shaped portion, D, being elongated for the purpose of adjusting the length of the bar, if desired, although I do not limit myself to this construction. The bars, D, pass through slots, respectively, in the plate, 118, secured at each side of the machine to the frame, 100ˣ, the ends of each of the bars being, respectively, secured to one end of a corresponding bell crank lever, E, see Fig. 6. The bell crank levers are pivoted at their angles on a shaft, F. The opposite end of each bell crank lever, E, is secured to a link, G, which is connected to one of the drivers, H. Each of said drivers is provided with a projecting lug, $h$, to which said link, G, is attached, and capable of a slight rotary movement forward and downward when the bell crank lever is rocked by the depression of the bar, D. The drivers, H, extend across the machine from one side to the other, and are provided at each end with a small rounded portion, $h'$, which fits and is movable within one of a series of openings in one of the supports, J, J, which extend along each side of the machine, (see Fig. 1).

Each of the drivers, H, is adapted to engage one of a series of preferably nine pins, L, which are mounted in the adding machine carriage, N (see Figs. 16 and 17). Each of the pins, L, is preferably provided with a shoulder, $l$, against which one end of a coil spring, $l'$, rests, the other end of said spring engaging with the lower portion of that part of the carriage, N, in which the pins, L, are placed, the action of the spring tending to raise the pin after the driver, H, has pressed it down.

I place about the shaft, F, on which the bell crank levers, E, are pivoted, springs, E', so adjusted that th resiliency of each spring will force its bar, D, upward after the finger has been removed from the typewriter key, and at the same time raise the driver to its normal position.

As the carriage, N, moves from one side of the machine to the other, see Figs. 4, 6, 16, and 17, the pins, L, will pass over and above a series of pins, O, placed in pin frames, M, which pin frames are each attached, by means of an arm, O', and link, O², to a rack, P, which engages one of the adding wheels, Q, respectively. When one of the pins, L, is depressed by a driver, H, as shown in Fig. 16, it will cause one of the pins, O, to be projected beneath its pin frame, M. This pin will then be in the path of movement of a rack advancing bar, R, which extends across the machine, and is brought forward, in a manner hereinafter more fully explained by pulling on either of the hooks R', arranged on each side of the machine, see Figs. 1, 6 and 37, and which bar will then engage the pin, O, and cause the rack, P, attached to its pin frame to move forward, and thereby rotate the adding wheel. The amount of rotation of the adding wheel depends, as is apparent, upon the position of the pin, O, in the frame, M.

In Fig. 17, the bar, R, is shown in contact with the pin, O, which has been depressed; the rack, P, is shown in contact with the adding wheel, Q; and the forward movement of the bar, R, has necessarily caused the adding wheel, Q, to rotate in the direction of the arrow. The figures, numerals, or characters, upon the periphery of the adding wheels, are so arranged, in reference to the said pins, O, that the depressed pin will cause the adding wheel, (assuming that it originally stands at zero) to be moved to a position such as to exhibit a numeral corresponding to that of the number key of the typewriter, through the depression of which the pin was set.

It is, of course, necessary to arrange for forcing the pins, O, back into the frame, M, after the adding wheel has been rotated to its proper position. This is accomplished by means of a bar, $r$, Figs. 6, 7 and 37, extending across the machine from one side to the other, the ends of which may be caused to move along the inclined portions, $r'$, $r'$, of the elongated slots, $r^2$, $r^2$, in the blocks, R², R², attached to the driving rack bars, U, U, at each side of the machine, and as a result of which the bar, $r$, may be caused to rise and restore the pins in the frames, in a man..er which will be more fully described.

In the normal position of the mechanism, the ends of the bar, $r$, will rest in the elongated slots, $r^2$, $r^2$, forward of the inclined portions, $r'$, as illustrated in Fig. 6.

As clearly illustrated in Fig. 37, the pin-restoring bar, $r$, is pivoted to a lug extending from the rear of the rack-advancing bar R. This rack-advancing bar, R, and a rack-restoring bar, 58, are connected by the two side bars R³, R³, so as to form a self-contained or rigid register driving frame, which may be moved as a unit in a forward and backward direction relative to the machine frame. Provision for such movement is afforded by passing the ends of bars R and 58 through slots in the machine frames J, J, and securing their ends to the bars R³, R³, just without said frames. Shoulders 58', 58', may be provided in the upper walls of said slots to limit the rearward movement of the driving frame and thus determine its normal position.

For reasons which will hereinafter be explained, the forward and rearward movements of the bars, R, $r$, and 58, should not be commensurate with the movements of the rack bars, U, U, but said bars, U, U, should first be permitted to move a material distance before picking up the bars, R, $r$, and 58. To effect such delayed movement, each end of the bar 58 is extended, as at 58², 58², so as to be alternately engaged by the fronts U², U², of the blocks R², R², and by lugs U³, U³, projecting from the under sides of the rack bars U, U. As shown in Fig. 37, the bars R, $r$, and 58 are in their normal positions. The rack bars U, U, are illustrated as having been started on their forward movements. Such movements will not be communicated to the bars R, r, and 58 until the fronts U², U², of the blocks R², R², engage the projections 58², 58², after which the rack bars U, U, and bars R, r, and 58 will move together to the limit of their forward movements. On return movement of the rack bars U, U, the bars R, r, and 58 will remain at rest in their forward positions until the lugs U³, U³, on the bars U, U, are moved back into engagement with the projections 58², 58², after which the bars R, r, and 58 will be returned by further rearward movement of the rack bars U, U, to their normal positions.

When the rack bars, U, U, are first moved forward, the inclines r', r', will be moved out from under the ends of the bar, r, and as the rack bars U, U, are continued in their forward movements, the bar, r, will be impelled forward, but because of its position in the rear ends of the slots, r², r², it will pass beneath the depressed pins in the pin frames. After the completion of the forward movement, any of the set pins O, in the frames M, will be lined up immediately in front of the rack advancing bar R and directly over the pin-restoring bar r, as indicated in Fig. 17. Upon the return of the rack bars after the rotation of the adding wheels, the inclines, r', r', will first be forced under the ends of the bar, r, thus raising the bar into the slots r², r², and causing the bar, r, to rise and press the pins back into the frames.

I also provide a means for restoring the pins in the frame after they have been depressed, without moving the rack bars, U, U, and, therefore, the adding wheels, for the purpose of correcting an error made in striking the keys prematurely or erroneously. This is accomplished by means of the sliding beveled bar, 55, (Figs. 5, 7 and 37) in the carriage, N, beneath the frame, M, so positioned that it will engage any pins that may be depressed. The beveled bar, 55, is slidably supported in the carriage, N, by the flanges, 56, on each side of the lower portion thereof, fitting into corresponding grooves in the side of the carriage, Fig. 37. The ends of the bar, 55, engage the cross bar, r, and the bar 58, which extend across the machine, and are secured to the side bars R³, R³, so as to constitute a driving frame, as hereinbefore described. On movement of the carriage N from side to side, the bar, 55, will be carried therewith, its ends moving along the surfaces of the bars, r, and 58. On forward and rearward movement of the bars R, r, and 58, the bar, 55, will be caused to slide endwise between the retaining flanges on the forwardly-projecting element of the carriage N. When the pins, which have been erroneously depressed, are to be replaced in their frames, a movement of the carriage of the typewriter across the machine will carry the carriage of the adding machine also across the machine, and the beveled bar, 55, will engage and raise the pins.

It will be noticed that there are a series of springs, o, around the pins, O. These, however, are simply friction springs for the purpose of causing the pins to retain the positions in which they are placed, either depressed or raised. Without something of this kind they would be liable to drop. I have shown, in Fig. 18, one of these springs in elevation, but I may use springs such as are shown in Fig. 19, comprising strips of spring metal, o, placed under and over the pins, respectively, using perhaps three, or I may use the form of spring shown at the left, Fig. 20, which is a wire bent about the pin, having one turn only around it. I do not limit myself, therefore, to any particular construction of friction springs, as any means for gently retaining the pin in position will accomplish the desired result.

For the purpose of guiding the racks, P, in their movements backward and forward under the impulse of the bar, R, I provide, preferably, a rack-carrier comprising a series of rails, S, see Figs. 9, 13, and 38, between which the racks reciprocate, the rails, S, being preferably provided with grooves, s, and ribs, s', which coöperate with corresponding ribs and grooves, respectively, of the racks, P. Each of the racks, P, is thus positively retained during its movement within the space between the rails, S. The frames, M, are each provided, preferably near the ends of the upper portions thereof, with upwardly-extending T-shaped members, T, Fig. 35, movable within grooves formed by the series of spaced bars, 99, (see Fig. 38), extending lengthwise of the machine.

I arrange these frames, M, and racks, P, with their connections, side by side, placing within what may be termed a nest, a series of eleven adding wheels, Q, and eleven racks, P, and eleven frames, M, Fig. 38. I thus have adding wheels which will show the cents and dollars, to any desired degree, up to billions, adjusting the space between the wheels to provide for the position of the decimal point, thousands, millions and billions. Of course, I do not limit myself to the number of these wheels or to their spacing as they may be arranged to suit the work to be performed.

One method of setting in motion my mechanism is to pull forward one of the hooks, R', R'. There is one hook, R', on each side of the machine, which hooks are attached to the rack bars, U, U, respectively. The rack bars U, U, are channel-shaped as shown at 59, 59, Fig. 37, so as to provide T-shaped grooves, 60, 60, these grooved bars thus forming tracks to run on rollers 61, pivoted to the ends of spindles, 62, secured to the machine frames, J, J. The rack bars U, U, are thus supported by and move upon the rollers, 61, in the T-shaped grooves 60, (see Figs. 7 and 37). For the purpose of returning the rack bars after they have been drawn forward by means of one of the hooks, R', R', I place on one side of the machine, a spring U', secured at one end to the frame of the machine, at u, and at the other end secured to one of the rack bars, U, U. If desired I may place a similar spring, or other suitable device, in the opposite side thereof. I do not wish to limit myself to the particular mechanism for returning the rack bars after they have been drawn forward. The rack bars, U, U, are preferably provided, as shown in Fig. 6, with teeth on the upper and lower surfaces thereof. On the right side of the machine, shown in Fig. 6, the teeth on the upper surface of the rack bar engage the toothed wheel, 2, which is keyed to or rigidly mounted upon a flattened shaft, 4 (see Figs. 6, 16, 17 and 37). The other end of the shaft, 4, has a bearing in the frame of the machine. The lower teeth on the rack bar U, on the right side of the machine, engage a toothed wheel, 3, which is mounted upon a shaft, 5, see Figs. 2, 6 and 37. On the opposite or left-hand side of the machine, the teeth on the upper surface of the rack bar engage the toothed wheel, 6, which is connected, by a lost-motion coupling, to a flattened shaft, 7, (see Figs. 6, 16, 17, and 37), and the lower teeth on the rack bar U, on that side engage the toothed wheel similar to the wheel, 3, and mounted upon the shaft, 5, upon which the toothed wheel, 3, on the right side of the machine is mounted. Located in a position for engagement with the lower teeth on the rack bar U, on the left side of the machine near the front thereof, is a pawl, 9, (see Figs. 6 and 37), which is secured or mounted upon a flattened shaft, 8.

It will thus be seen that upon the movement forward of the rack bars U, U, rotary motion will be imparted to the wheels, 2, 3 and 6, and the shaft, 8, and the bar R, will be brought forward to engage the pins projecting from the pin frame M. On the completion of the stroke forward, the operator removes his hand from hook, R', the bar, 58, engages shoulders 319, on pin frames, M, and under the impulse of spring U' all are returned to normal position, the bar, r, sliding up inclines r', r', during the initial part of the return movement, and thus forcing back pins, O, that may have been projected.

The flattened shaft, 8, (see Figs. 1, 6, 14, 16, 17 and 37), extends across the front of the machine and is provided at one end thereof with the pawl, 9, so located as to be engaged and moved by the lower teeth on the rack bar, U, on that side of the machine during the initial portion of its forward movement, and thus causing a rotation of said shaft from the position indicated in Fig. 14 to that indicated in Fig. 17, so as to bring the rounded portion of the shaft in contact with the under surface of the rack carrier, comprising the rails S, between which the racks, P, slide, and so as to thus lift the racks, P, into engagement with the adding wheels, Q, prior to their forward movements to rotate said wheels. On the initial portion of the return movement of the rack bars U, U, the pawl, 9, will be engaged by the nearest one of the lower teeth on the left-hand rack bar and moved back so as to impart a return rotation to said shaft 8, from the position indicated in Fig. 17 to that indicated in Fig. 14. This second rotation of the shaft, 8, causes the rack carrier to be lowered to its normal position in which the racks, P, are disengaged from the number wheels, so that on the subsequent return movements of said racks, the wheels will not be rotated. In order that the pawl, 9, may be positively engaged by the lower teeth of the left-hand rack bar U, at each alternate forward and backward movement thereof, said pawl may be loosely connected to the shaft 8, by means of a lost-motion connection so as to be permitted to have a slight rotative movement with respect thereto, and a light spring may be provided between said pawl and the machine frame, of sufficient strength to turn the shaft 8, but tending to turn said pawl toward a vertical position, as far as may be permitted by said lost-motion connection, so as to insure its engagement with the teeth of the rack bar U, on movement in either direction.

It may be observed that on the forward movement of the rack bars U, U, the rotation of the shaft, 8, is effected before the rack-advancing bar, R, is picked up and caused to move the racks, P, and that on the return movement of the rack bars U, U, the return rotation of the shaft, 8, is again effected before the rack-restoring bar, 58, is picked up and caused to return the racks, P.

The shaft, 5, and pinions 3, 3, engaging with racks on the lower sides of the rack bars, U, U, provide means for causing both of said rack bars to be moved forward uniformly, without binding, on pulling either of the handles R'.

The flattened shaft, 4, is for the purpose of assisting in making the "carry," as is also the flattened shaft, 7, and will be hereinafter more particularly described.

It will be noticed that the adding wheels, Q, are preferably toothed, or provided with a series of projections on their peripheries, upon each of which, as hereinbefore stated, the numerals or characters are placed, but one of these projections, Q, is longer than the others, that is, extends farther from the main body of the wheel, so as to provide means for starting or initiating a "carry."

Although the adding wheels may at any time be returned to zero in the usual manner by adding the complement of the number previously accumulated thereby, the following described zero setting device may also be used for that purpose. The adding wheels are mounted upon a shaft, V, which shaft is normally stationary, and each adding wheel is provided with a ring, V', see Figs. 24, 25 and 26, which ring is provided with a lug, V'', and a recess, V³, and in the shaft, V, is mounted a movable unit, W, which may be caused to engage the lug, V'', and thereby rotate said number wheel to its normal "0" position, when shaft, V, is rotated by means which will be described. When the wheels, Q, are moved by the racks, P, they will rotate upon the shaft, V, the movable unit, W, passing the lug, V'', idly. The shaft, V, is mounted in plates, X, X, which form the frame or outside portion of the nest in which the adding wheels are contained, there being one such shaft for each nest, and upon a prolongation of the shaft, V, through the plate, X, on one side of the nest, is a gear, Y, (Fig. 2), which meshes with a gear, Y', on a shaft, Y², which extends across and to the left side of the machine, as shown in Fig. 2, and upon the end of which there is a suitable lug or pin, y, (Fig. 1), which will engage with the recess, y', on the key, K, as shown in Fig. 4. Thus, by placing the key, K, upon the end of the shaft, Y², and operating the same, the adding wheels, Q, may be turned to zero.

For the purpose of moving the nests of register mechanism from one side of the machine toward the other, in order to be able to place the column of figures upon the written page in any desired position and add the amounts written in such column, I place across the machine two racks, one, 63, near the rear of the machine, see Figs. 5 and 6, and the other, 64, just forward of the adding wheels near the front of the machine, (see Fig. 2). Engaging with the racks, 63 and 64, are the pinions, 65 and 66, on the spindles 67, mounted in the frames of the nests. For the purpose of operating the spindles, 67, I preferably square the ends thereof, 68, as shown in Figs. 2 and 28, which may be operated by means of a key placed thereon. Thus, by rotating the spindles, 67, and their pinions, 65 and 66, which mesh with the racks, 63 and 64, the nests will be caused to move transversely of the machine. The nests are supported by and movable along the shaft, 4, at the front of the machine, and in the rear they are supported by and movable along the upper portion of the rack, 63.

Figure 2:
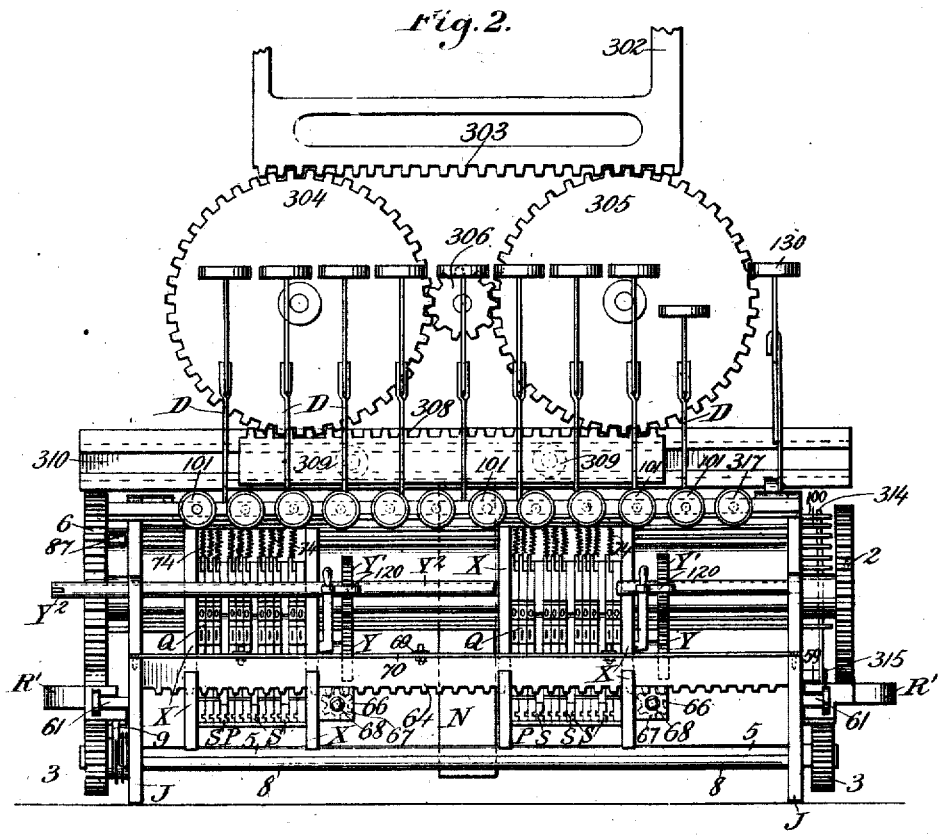
Fig. 2 is a front elevation thereof.

Upon the framework I place a scale 70, shown in Fig. 1, with indicators, 69, movable in a slot, 70', see Fig. 8, to indicate the desired position of the nest in reference to the page. It is apparent that by fixing the indicators in the position desired, the nests may be moved by means of the pinions and spindles, aforesaid, to bring them, the nests, in proper position to cause the figures to be registered, that are typewritten in any desired place widthwise of the work-sheet. Any number wheel, Q, in either nest may be brought into register with any desired division on the scale, by first adjusting the index to that division and then adjusting the rest, until the particular number wheel registers with the index. This scale agrees with the usual platen scale, so that a figure written in a certain position relatively to the platen scale will be added on that number wheel which has the same position relatively to the scale at Fig. 1.

For the purpose of making a "carry," which it is necessary to provide for when one of the wheels passes from "9" to "0," so that the next adjacent wheel will be moved one step or projection forward, I have provided a series of latches 71, mounted on a spindle secured to the sides of the nests and a series of locking points, 72, by means of which, and their connections, the adding wheels may be locked in position, released and moved forward, when a "carry" is to be made.

It is understood that in making the "carry" the adding wheel which is rotated beyond the nine must provide for moving the next adding wheel on the left one space; therefore, the projection, q, of the adding wheel which engages the latch 71, causes the point, 72, in engagement with the next adding wheel to the left to move that wheel one space, which may be accomplished under the influence of the apparatus adjusted and connected up as herein described.

See Figs. 14, 15, 16, 17, 37 and 38.

In Fig. 38 it will be seen that there is a latch, 71, a locking point, 72, and bar, 75, with arm, 76, for each adding wheel, excepting the first wheel which only requires a latch, in order to effect a carry on the wheel to the left. The first wheel is never operated under influence of a "carry" mechanism, as the rack, P, alone, governs the movement of this wheel.

These latches, 71, locking points, 72, and bars, 75, with their arms, 76, are placed side by side in the following order, a latch, 71, for the first wheel controls the bar, 75, which carries thereon a locking point, 72, which point meshes with the second wheel to the left. The second wheel governs a latch, 71, which controls a bar, 75, carrying a locking point 72, which meshes with the third wheel to the left and so on across the nest.

The actual accomplishment of the carry only takes place on the return movement of the racks, U, U. The forward movement of the racks, U, U, positions the mechanism for a carry.

In Fig. 37, it is clearly shown that the action of the flattened shafts, 4, 7 and 8, is controlled by the gears, 2, 6, and pawl, 9, and these are governed by the forward and return movements of the racks, U, U.

Figs. 14 and 16 represent two different positions in which the parts of the mechanism may be left at the completion of a computing operation of the machine, and therefore may each be properly said to show the mechanism in its normal position. Fig. 14 shows the relative positions in which the parts of the mechanism will be left after a computing operation which did not require a carry to be effected. Fig. 16 shows the relative positions in which the same parts will be left after a computing operation which does require a carry to be effected. In each of these views the rack, P, is illustrated as being out of engagement with the wheel, Q, and the locking point, 72, is shown in locking mesh with the adding wheel being forced in mesh by spring 74. The flattened portion of rotatable shaft, 4, and the rear end of slot, 73, are so related as to permit the locking point, 72, to be moved forward to its effective locking position. The locking point, 72, is slidable on a bar, 75, having an arm, 76, drawn upward by a spring, 77, and forced downward when shaft, 7, is rotated, for the purpose of effecting an engagement between the lug, 79, on the arm, 78, on the bar, 75, and a lug or projection, 80, on the latch, 71. This interengagement between the latch, 71, and bar, 75, is intended to prevent the spring, 77, from pulling the bar, 75, upward in the rear against the flattened portion of the shaft, 7, so as to thereby move the locking point downward, until after a computing operation which causes the long projection, q, on adding wheel Q, to depress the latch, 71, so as to break the engagement between the lugs, 79 and 80, and thereby initiate a carry.

On the rear of latch, 71, is a lug, 81, with an indentation, 90, which indentation may be caused to engage and lock with a lug, 88, on the spring bar, 91, secured to a bar, 92, which holds the latch, when once depressed, out of engagement.

On the shaft, 7, at the left side of the machine, Figs. 14 and 37, is a projection, 87, which on the forward movement of the racks, U, U, is caused to engage and move a dog, 86, fastened to a shaft, 84, against the tension of a spring, 85. Mounted on the shaft, 84, is a guard, 82, comprising a rounded strip or bar secured to or formed integral with a sleeve, 83, loosely keyed to said shaft. The normal tendency of said spring is to keep the dog, 86, and guard elevated. On clockwise rotation of the shaft, 7, the lug, 87, will engage and move the dog, 86, and thereby cause the guard, 82, to restore any of the latches which may have been depressed by a carry from the position illustrated in Fig. 16 to that illustrated in Fig. 17.

Fig. 17 shows parts of the mechanism after one of the pins, O, in a pin-frame, M, has been depressed and after the rack-bars, U, U, have completed part of their forward movements. The relative positions of the parts may be assumed to have been originally as illustrated in Fig. 16. The first movement of the rack-bars causes the shafts, 7 and 4, to be rotated in a clockwise direction, and the shaft, 8, to be rotated in a counterclockwise direction. The counterclockwise rotation of the shaft, 8, elevates the rack-carrier and causes the racks, P, to be brought into meshing relation with the adding wheels, Q. The clockwise rotation of the shaft, 4, cams the locking points, 72, back out of their locking engagement with said adding wheels. The counterclockwise rotation of the shaft, 7, restores any of the bars, 75, which have been released from their latches, 71, as indicated in Fig. 16, to the position shown in Fig. 17. The movement of the dog, 86, by the lug, 87, on further rotation of the shaft, 7, causes the guard, 82, to restore any of the latches which have been depressed, as indicated in Fig. 16, to the position indicated in Fig. 17, so as to cause them to reëngage and hold their respective bars, 75, against the influence of the springs, 77, when subsequently released by return rotations of the shaft, 7. This is all effected on the initial movement of the rack-bars, U, U, before they pick up the register-driving frame and its rack-advancing bar, R, so as to advance the racks P. Further movement of the rack-bars, U, U, causes the bar, R, to be advanced so as to engage any of the pins, O, which may have been depressed, and thereby pick up and move forward the corresponding frames, M, and connected racks, P, thus effecting rotations of the corresponding adding wheels, Q. Had the relative positions of the parts of the mechanism originally been as illustrated in Fig. 14, the rotation of the shaft, 7, and movement of the dog, 86, would have been idle except that the round portion of the shaft, 7, would be brought into position to prevent movement of the bars, 75, by their springs, 77.

The rotation of any of said adding wheels, Q, as a result of the forward movement of its rack, P, may cause said wheel to be advanced from "9" to "0", at which time its projection, q, would engage and depress its latch, 71, from the position shown in Fig. to that shown in Fig. 16, in which it will be retained by the lug, 88. In this position, it no longer serves as a means for preventing movement of the bar, 75, the movement of which is, however, temporarily restrained by engagement between its arm, 76, and the round portion of the shaft, 7. By this means a carry has been prepared or initiated but has not been fully consummated.

On return movement of the rack-bars, U, U, the rack-carrier will first be lowered, as a result of the clockwise rotation of the shaft, 8, from the position illustrated in Fig. 17 to that illustrated in Fig. 16. The locking points, 72, will be permitted to reengage the teeth of the adding wheels, Q, as a result of a counterclockwise rotation of the shaft, 4, to its normal position, as illustrated in Fig. 16, and the shaft, 7, will also be rotated in a counterclockwise direction to its normal position, as illustrated in Fig. 16. On the return rotation of the shaft, 7, the lug, 87, will engage and move the dog, 86, so as to pass by the same, thereby idly lifting the guard, 82, without otherwise affecting the mechanism.

The return of the shaft, 7, to the position shown in Fig. 16, permits any of the bars, 75, which have been freed from their engagement with the latches 71, as above described, to be moved by their springs, 77, from the position illustrated in Fig. 17 to that illustrated in Fig. 16, and since the corresponding locking points, 72. are, at the time, in locking engagement with the teeth of the corresponding adding wheels, Q, each of said wheels will be advanced one step. In this manner the initiated carries will be completed.

If the rotation of an adding wheel, Q, by the rack, P, does not cause said adding wheel to advance from "9" to "0", its latch 71, will not be depressed by the projection, $q$, of said wheel, and on return rotation of the shaft, 7. the bar, 75, will still be retained by said latch, 71, as illustrated in Fig. 14, and no carry to the adding wheels of next higher order will be effected.

Should the completion of the carry to any adding wheel, Q. cause said wheel to be advanced from "9" to "0", its projection, $q$, would depress the corresponding latch, 71, from the position illustrated in Fig. 14 to that illustrated in Fig. 16, so as to release the bar, 75, controlled thereby, and since, at the time of completion of a carry, the shaft, 7, is in its normal position, the bar, 75, would be immediately moved by its spring 77, from the position shown in Fig. 14 to that shown in Fig. 16. Such a carry would be continued from order to order, should a number of adding wheels in succession be turned from "9" to "0" on the completion of a carry.

It will now be apparent why the computing elements of certain orders will be left in the relative positions indicated in Fig. 14, and others in the positions indicated in Fig. 16, after a computing operation. If a computing wheel has passed from "9" to "0," during the computing operation, its projection $q$ will depress its latch, a carry will be effected, and the parts will be left in the positions illustrated in Fig. 16. If the adding wheel is not rotated from "9" to "0," its latch will not be depressed and the parts will remain in the positions indicated in Fig. 14. The elements of the mechanism which are left in the positions illustrated in Fig. 16 will, however, in the manner above described, be restored to the positions illustrated in Fig. 17, before the racks, P, are moved forward so as to be in proper condition for the initiation of a carry during the subsequent rotation of the corresponding adding wheels Q.

It will be noticed that the wheel 6, which is loosely mounted upon and rotates the shaft, 7, is provided with a slot 200, and the shaft is provided with a spline, 201, (Figs. 3 and 37), engaging said slot, allowing for a certain lost motion or play, in the forward movement of the racks, U, U, whereby the wheel, 6, can move a certain degree before the shaft, 7, is rotated. This arrangement prevents binding between the shaft, 4, and locking point, 72, and the shaft, 7, and arm, 76.

It also provides for a delayed action of the shaft, 7, with respect to the shaft, 4, so as to insure the release of the adding wheels from their locking points 72, prior to the restoration of the bars 75 from the positions indicated in Fig. 16 to those indicated in Fig. 17, and so as to insure the re-engagement of the locking points, 72, with the teeth of their adding wheels prior to the completion of an initiated carry. As shown in Fig. 16, the adding wheels are locked by locking points, 72, and no further movement can take place until rack, P, is brought into engagement therewith, and the rack, U, moved forward.

For the purpose of stopping the carriage in the position desired, relative to units, tens, hundreds, etc., I have a tabulating device consisting of a series of denomination-stops operative in the nests, which nests are movable across the machine by means hereinbefore described, the stops being actuated by driving frames, to which they are slidably attached, and by means of which said stops may be projected into the path of movement of a coöperative stop carried by the adding machine carriage. I place the frames, 100, around the machine, as shown in Figs. 1, 2, 5 and 6, each of which has attached to the forward part of it a key, 101, pressure upon which will move the frame toward the rear of the machine. On the side of the frame opposite that to which the keys, 101, are attached, each frame is provided with a stop, 102, (Figs. 1, 6 and 23), which passes into suitable openings, 103, (Fig. 3), in the box or nest in the rear of the machine, shown in Figs. 6 and 38.

These stops may be severally projected into the path of movement of a vertically-disposed roller stop, 107 (Fig. 6), carried by the carriage, N, thus providing means for bringing said carriage to rest at any of the various denominational positions of the computing mechanism, as units, tens, hundreds, etc., by pressing forward the particular key which is attached to that one of the stop-operating frames which controls the stop determinative of the position desired.

For the purpose of returning the tabulator-frames, 100, and their connected denomination-stops, 102, to normal position, I provide coil springs, 104 and 105, on the spindle, 106, said spindle being mounted in the frames, J, J, of the machine. Mounted on the ends of said spindle are levers, 110, connected by links, 108, to bars, 109, which are so positioned in the machine-frame as to be engaged and moved rearwardly by any of said tabulator-frames when displaced. The springs, 104 and 105, are so connected as to oppose the movement which will be communicated to the spindle, 106, through the intermediary of the aforesaid connecting elements, when one of said frames is displaced, and their tension is sufficient to cause any such displaced tabulator-frame to be restored to normal position.

In a typewriting machine, such as the Underwood, having a tabulator-key, 130, as indicated in Fig. 6, it is a known fact that the depression of this key releases the dogs on the typewriter, permitting the typewriter carriage to travel across the machine until stopped by something. To accomplish the releasing of the typewriter carriage by my tabulating device, I merely fasten in a secure manner an arm, 126, to the arm, 110, which is mounted on spindle 106. To the end of the arm, 126, I loosely connect a strip, 127, having a lip, 128, which fits over the top of the typewriter tabulator-key, 130. As thus connected up it will be seen that by pressing any one of the tabulator-keys, 101, of the adding device, the corresponding frame, 100, and the links, 109, 108 and 110, will be acted upon and will, of course, through the arm, 126, and strip, 127, depress the typewriter tabulator-key, 130, by means of the lip, 128, thus releasing the carriage of the typewriter and therefore the carriage of the adding device, owing to their connections in the rear of the machine.

The carriage of the adding machine, and, therefore, the carriage of the typewriter, will be arrested in its movement by the denominational stop, 102, which has been pressed forward by frame, 100, at the time the key, 101, was pressed, the said stop, 102, having been thus projected into the path of movement of the roller stop, 107, on the adding machine carriage.

For the purpose of connecting the carriage of the adding machine to the carriage of the typewriter, I secure, by means of screws, 300, the arms, 301, 302, which carry the rack, 303, the teeth upon which engage with the top of the gears, 304, 305, the gears being mounted on the rear of the machine, as shown in Fig. 5. Between the wheels, 304, 305, is a pinion, 306.

I do not limit myself to this means for connecting the arms, 301, 302, to the carriage, 307, of the typewriting machine, since it is apparent that many devices may be used for making the connection. I, however, prefer the arrangement shown, in which a rack engages with the tops of the wheels, after being connected with the typewriter carriage.

The rack, 308, which engages the teeth of the gears, 304, 305, on the opposite side from the rack, 303, is connected with the adding machine carriage, N.

Rotatably mounted on bearings extending from the back of the rack, 308, is a series of anti-friction rollers, 309, adapted to run freely along a track bar, 310, attached to the frame of the machine.

It is apparent that, as connected through the intermediary of the gears 304 and 305, the movement of the typewriter carriage will be communicated to the adding machine carriage, but that the direction of movement of the adding machine carriage will be opposite to that of the typewriter carriage.

For the purpose of steadying the adding machine carriage, N, I place beneath its lower forward end rollers 312×, (see Figs. 5 and 6), which engage with the bar, or plate, 313, extending across the machine. I also place rollers, 312, on the forward upper end of the carriage, which engage with the bar, 311, extending across the machine, which forms a support for the forward ends of the carriage, and permits the easy movement of the same on its support.

For the purpose of throwing the adding apparatus out of engagement with the typewriter keys, I provide a frame 100×, (Figs. 1 and 6), extending around the front and sides of the machine, and having secured thereto, or comprising, as a part thereof, a slotted strip 118, through which the bars, D, are placed. The side members of said frame are connected, at their rear ends, with vertical levers 314, which levers are fulcrumed at 315, to the frame of the machine, at the respective sides thereof, as shown in Fig. 6. Supported at its ends by the lower ends of said levers is a bar or shaft, 316, extending across the rear of the machine. Slidably mounted in the frames of the nests of register mechanism, so as to be freely movable forwardly and backwardly therein, are dogs 318, 318, each dog having a splined connection at its rear end with the shaft 316, so as to be movable therealong as the nest in which it is mounted is moved from side to side of the machine frame. These dogs normally extend forwardly and have engaging relation with teeth of the fixed rack bar 63, and thus serve as a locking means between each of the nests and the rack, so as to take the impact of the blow, which is communicated to the nest, during a tabulating operation when the carriage stop, 107, comes up against a set tabulator stop 102, mounted in said nest. When the key, 317, is pulled forward, the shaft, 316, will be moved rearwardly or forced backward, thus withdrawing the dogs 318 and releasing the connection between said dogs and the serrations on the rack, 63, (see Fig. 6), and the bars, D, will at the same time be drawn forward, thus breaking the connection between the ends of the bars, D, and the typewriter type-bar levers.

For the purpose of returning the individual nests to zero, I provide a pinion Y', which may be brought into engaging relation with the gear Y, on the shaft V, carrying the adding wheels, and to the sides of the nests is fastened an upright or post 119, upon which a lever 120, is mounted (Figs. 1 and 6), the end of which lever, 120, has a curved portion to fit loosely on the sides of the pinion Y'. It will thus be seen that a movement of the lever 120 in one direction would disengage the pinion Y' from gear Y. A reverse movement of lever, 120, would cause pinion, Y', and gear, Y, to mesh, and by rotating shaft, Y², upon which pinion Y' is keyed, the adding wheels may be brought to zero through the engagement of the unit, W, with the lug, V", the unit W turning with the shaft V, which shaft revolves when gear Y is acted upon by its pinion, as heretofore described.

For the purpose of restoring the pin racks, the bar 58, extending across the machine, engages the shoulders, 319, of the pin frames M, and carries them back to their normal position.

I have shown, in Fig. 11, a means for constructing the flattened shaft in such a way that the engagement between the flattened portion of the shaft and the part to be operated on in making the "carry" (see Figs. 14, 16 and 17) may be done without more friction than is necessary, because when a shaft is provided with one portion flattened and the other rounded, as herein disclosed, it is advisable to arrange for the easy and unobstructed passage from the one portion of the shaft to the other, in its engagement with said portion. This I accomplish by mounting a roller, 320, in a suitable groove 321, in the side of the shaft 322, adjoining the flattened portion thereof, as shown in Fig. 11.

I may provide each of the shafts, 4, 7, and 8, with a roller mounted substantially as above described and as illustrated in Fig. 11.

I show in Figs. 30, 31, 32 and 33 a modified "carry" mechanism, in which I do away with the springs 74. To this end, each of the locking points, 72, is connected, by means of a shaft, 324, passing through an elongated slot, 325, at the end of the locking point, 72, farthest from its place of engagement with the adding wheel, Q, to arms, 323, projecting from segments, 326, pivoted to the frame of the nest of register mechanism. The latch, 71, and other parts of the carry mechanism are substantially the same as those already described in connection with the "carry" illustrated in Figs. 14, 15, 16 and 17.

If a carry has been effected during the preceding computing operation, the parts will have been left in the positions illustrated in Fig. 30. If no carry has been effected, they will have been left in the positions illustrated in Fig. 32. In view of the lost-motion connection, heretofore described, between the shaft 7 and its driving gear 6, the rounded portion of the shaft 7 will not engage and move the arm 76 of the bar 75, from the position indicated in Fig. 30 to that shown in Fig. 31, until after the locking point, 72, has been withdrawn from its engagement between the teeth of the adding wheel Q. The withdrawal of the locking point is effected during the initial movement of the rack bars U, U, as a result of the engagement of teeth on the upper surfaces thereof with teeth on the segments 326, as a result of which the segments 326 and arms 323 are rocked from the positions illustrated in Fig. 30 to those illustrated in Fig. 31, after which rotation of the shaft 7 will restore any of the bars 75 and their locking points, which may have been left in the positions illustrated in Fig. 30, to those illustrated in Fig. 31. The carry will be initiated during the rotation of the wheels Q, by the advancement of the racks P, by releasing the latches 71, in the manner heretofore described in connection with the form of mechanism illustrated in Figs. 14, 15, 16 and 17. On the return movement of the rack bars, the locking points will be caused to reëngage the teeth of the adding wheels, after which the shaft 7 will be returned to the position illustrated in Figs. 30 and 32. If a carry has been initiated in any denominational order, the corresponding locking point will be moved by the spring 77, to the position indicated in Fig. 30, thus completing the same. If a carry has not been initiated, the parts will remain in the positions indicated in Fig. 32, the bar 75 being prevented from moving to the position shown in Fig. 30 as a result of the engagement between said bar and its latch 71, as in the first form described.

I show in Fig. 33 a side view of the point 72, showing the elongated slot 325.

In Fig. 34, I show detail views of the connection of the segment 326, and the rack bar U.

In Fig. 13ˣ (Sheet 6), I show a modified form of key connection for operating the drivers, H, and typewriter keys, C, which form of mechanism does away with the necessity of having to operate a key, such as the key 317, to break the connection between the typewriter keys, C, and the adding machine bars, D.

The rear ends of levers 131 may be fastened in any suitable manner at the back of the machine, and the other ends have keys, 132, with numerals thereon, corresponding with those of the typewriter numeral keys. Projecting from each key 132 is a lug 133, which lug would engage and depress the corresponding typewriter key C if the operator were to depress the said key 132, and at the same time the lug, 134, would operate the corresponding driver H. It will be seen therefore, that the typewriter keys, C, are at all times free for operation, independently of the adding mechanism, and when additions are to be made, the operator merely depresses the keys 132, which engage and depress, at the same time, the keys C, by means of the lugs, 133.

The following is a description of an electrical drive mechanism, shown in Figs. 37, 39 and 40, which may be employed, if desired, thus doing away with hand operation by means of the hooks R'.

A yoke 143 may be secured to the rack bars U, U, as shown in Fig. 37, and in an opening 146 in said yoke rides a roller 146' on an arm 144 fast on a shaft 145, mounted in a stationary bearing or supporting member 156. The rotation of this shaft 145 will, therefore, cause the yoke 143 and rack-bars U, U, to be reciprocated. A constantly revolving gear 160 has lugs 162 cut on its inner circumference, and the shaft 145 carries a collar 153, in which is pivoted at 152 a dog 151, which latter is pressed outward by a spring 154 to engage said lugs, and so carry the collar and shaft around with the gear. On a yoke 150, pivoted to the supporting member 156, and embracing said shaft 145, is formed a lug 155 which extends into the path of said dog 151 and engages it so as to withdraw it from said gear as the gear carries it around. A key 147 is fast on a rock arm 148 on a shaft 149, extending from said yoke, and, by depressing this key, the lug 155 is raised out of the path of dog 151, so that the dog may spring outward, engage a lug 162 on said gear, and carry the shaft and collar around with the gear. A lug 158 on said collar 153 extends upward so that its path may intercept a lug 159 on said yoke and swing it upward, returning the yoke against the depression of the key. This places the lug 155 again in the path of dog 151, so that it releases itself from gear 160, and the gear then turns idly.

The gear 160 may be turned by a pinion 161 on an electric motor or any other convenient source of power. The above connections provide means for driving the rack bars U, U, forward and back and then for disconnecting them from the source of power.

The operation, therefore, is as follows:

After the operator has depressed the numeral keys on the typewriter and the pins, O, have been placed so as to be engaged by the bar R, it is necessary, before any addition will take place, to force the register driving frame, comprising said bar R and the bar 58, forward. Since the yoke 143 is secured to each rack bar U, as shown in Fig. 37, by a screw, it will be seen that as yoke 143 is pushed forward and backward, under the revolution of the gear 160, the register-driving frame will have accomplished its work the same as it would were it drawn forward by hand. The operator having depressed numeral keys, as stated, now, merely depresses key, 147, which is fastened to the lever, 148, this being also securely fastened on shaft 149, will oscillate yoke 150, thus raising the point 155, thereby releasing the dog, 151. The spring 154, in collar 153, rigidly secured to the shaft 145, will bring the dog, 151, into the path of one of the lugs, 162, on the gear 160, which gear in its revolution will pick up the dog, 151, and the collar 153 with its lug 158, and move them in the direction of the arrow. This brings the lug 158, in contact with the point, 159, on the yoke 150, thereby restoring the yoke 150 and point 155 to normal position. Continuing its revolution, the gear 160 brings the outer edge of the dog, 151, in contact with the point 155, which action compresses the spring 154, and drives the dog 151 out of the path of the lugs 162, thus stopping the further operation of the yoke 143, after having moved the register driving frame forward and back to its normal position.

It is desirable, in order to guard against irregularity in the movement of the carriage, N, of the adding machine, and thereby the selection of a pin in the wrong column, to provide an independent escapement, Figs. 41 and 42. In addition to the racks 303 and 308, and the gears 304, 305, and 306, which form the connection between the typewriter carriage and the adding machine carriage, N, (see Fig. 5), I may attach a coil spring, 135, (Figs. 41 and 42), around which runs a tape of any suitable material 136, secured at the other end to the carriage N, the tendency of which is to constantly draw the carriage, N, to the right of the machine, subject to the controlling action of the dogs 137 and 138, which regulate the movement as will be now shown.

On the back of the adding machine carriage N, I hinge a pair of dogs 137 and 138, each having a spiral spring 139 and 140, for returning the dogs to normal position, the dog 137 acting as the escaping dog, the other dog, 138, acting as a permanent or locking dog during the time the escaping dog is out of mesh with the rack, 141, so as to enable the dog 137, under influence of its spring 139, to recover its normal position. Owing to the heel, 142, on the escaping dog, 137, the carriage N, under tension of spring 135, and tape 136, is prevented from traveling more than one tooth on the rack, 141, at a time. As the keys 132 and, therefore, the levers 131, are depressed, the levers, 131, engage a bar 145' extending across the machine underneath said levers, and said bar is connected by means of arms 147', 147', pivoted to each side of the machine at 148', to the rack 141. The depression of the bar 145' thus causes the rack 141 to be raised out of mesh with what may be termed the permanent or locking dog 138, the heel 144', on said dog, preventing movement of the carriage N, when said dog and rack are engaged. The lifting of the rack, 141, out of mesh with the dog, 138, meshes the rack, 141, with the escaping dog 137, and, under the tension of the coil spring 135, the carriage will move until the heel, 142, on the said dog, 137, is brought against the carriage N, thus bringing the dog 138 in position to engage the next tooth on the rack 141. The tooth of the dog, 137, remains in mesh with the rack, until the key depression has been relieved, so as to allow the rack to drop down and again mesh with the dog 138. This action liberates the dog, 137, in order that the spring, 139, may place said dog in position for a remeshing with the next tooth on the next depression of a key lever 131.

The levers 131 may be provided with suitable springs, 149', so as to be returned to normal position after each depression, said levers being mounted on a spindle 146² extending across the machine, and supported at its ends in the sides thereof.

In order to permit the return of the carriage to its starting position, after it has completed its travel across the machine from left to right, which is the operation previously explained, it is necessary, since the dog 138 acts as a locking dog while carriage, N, is traveling from left to right of the machine, and since its normal position is in mesh with rack 141, to so construct said dog 138 as to permit the rack to travel freely in the opposite direction. This I accomplish by cutting away or rounding the dog 138, at a point opposite to the heel, 144', in such a manner that it will move and permit the teeth to pass freely as the carriage is being drawn to the left of the machine.

As thus described and illustrated in Figs. 41 and 42, it will be readily seen that as the computing machine has its own escapement, and numeral levers, the typewriter might be removed, in which case there would still remain an independent adding machine. When so used a handle, 150', should be provided for returning the carriage to the left side of the machine after the completion of one computing operation in readiness for another.

What I claim as my invention and desire to secure by Letters Patent is:

1. The combination with a typewriter having number-printing mechanism, number keys, each representative of a different digit, to operate the same, and a letter-spacing carriage, of a computing mechanism including computing wheels and computing wheel actuators representative of each of a plurality of different denominational orders, each actuator having, as a connected part thereof, a plurality of settable movement-determining elements, each representative of a different one of said digits, a master setting device therefor having a single set of setting elements, each representative of a different one of said digits, a movement-transmitting connection between said carriage and said master setting device, whereby on movement of the former, the setting elements of the latter will be brought into coöperative relation with the corresponding movement-determining elements of said actuators in succession, means controlled by each of said number keys for operating the setting element corresponding with the digit represented by said key, the relation between the key-controlled operating devices and the setting elements being such as to preserve their mutual coöperative relation during the movement of the master setting device from actuator to actuator, and means for effecting movements of said actuators so as to rotate said computing wheels, the extent of such movements being determined by the settings of said movement-determining elements.

2. In an adding device adapted to be connected to a typewriting machine; a nest comprising the following elements, viz: a series of adding wheels, racks to engage said adding wheels, pin frames connected with said racks, and pins mounted in each of said pin frames; means for operating said pins in said pin frames; means for regulating and controlling the degree of rotation of said adding wheels by means of said pins, and means for moving said nest transversely across the machine.

3. In an adding device adapted to be connected to a typewriting machine; a nest comprising the following elements, viz.: a series of adding wheels, racks to engage said adding wheels, frames connected with said racks, and pins in each of said frames; means for operating said pins in said pin frames; means for regulating and controlling the degree of rotation of said adding wheels by means of said pins; a friction spring on each of said pins; means for moving said nest transversely across the machine; in combination with a carriage; a series of pins in said carriage; said carriage adapted to move transversely across the machine above said frames; a series of drivers; and means for operating said drivers by the action of the numeral keys on a typewriting machine.

4. The combination with a typewriting machine having number-printing mechanism, number keys, each representative of a different digit, to operate the same, and a letter-spacing carriage, of a computing mechanism including computing wheels representative of different denominational orders, a variably settable computing wheel actuator for each of said computing wheels, a master setting device for said actuators, a movement-transmitting connection between said carriage and said master setting device, whereby on movement of the former, the latter will be brought into coöperative setting relation with the different actuators in succession, an individual setting device controlled by each of said number keys for selectively effecting a setting operation of said master setting device characteristic of the digit represented by said key, so as to cause it to effect a corresponding setting of any actuator with which it may be in coöperative setting relation, and means for effecting movements of said actuators so as to rotate said computing wheels, the extent of such movements being determined by the settings of said actuators by said keys through said master setting device.

5. The combination of a typewriting machine having numeral keys; a series of adding wheels mounted to rotate; means for rotating said adding wheels, said wheels and said rotating means arranged in nests; means set in operation by the movement of the numeral keys on the typewriting machine to determine the extent of rotation of the adding wheels; means for correcting numbers erroneously struck before rotating said numeral wheels; means for adjusting said nests transversely of the machine, to permit placing the column of figures at different portions of the work sheet; and means for returning the adding wheels to the zero position.

6. The combination of a typewriting machine having numeral keys; a series of adding wheels; a shaft upon which they are loosely mounted; a means for rotating said adding wheels in one direction to add; means set in operation by the movement of the numeral keys on the typewriting machine to determine the extent of rotation of the adding wheels; a ring engaging in each adding wheel adjacent to said shaft, a lug projecting from said ring toward the shaft; an opening in said ring; and a key in said shaft adapted to engage said lug, whereby the positive rotation of said shaft in adding direction will cause said key to engage said lug and return said wheels to the zero position.

7. The combination of a typewriting machine; a series of adding wheels; a shaft upon which they are loosely mounted; a means for rotating said adding wheels in one direction to add; means set in operation by the movement of the numeral keys on the typewriting machine, to determine the extent of rotation of the adding wheels, a pinion; means on the end of said shaft to engage said pinion; a spindle carrying said pinion extending across the machine; means causing said wheels to engage said shaft when it is rotated in the adding direction and a means for rotating said spindle, whereby said shaft will be rotated and the adding wheels returned to zero.

8. In an adding device adapted to be connected to a typewriting machine, the combination of a series of adding wheels, a series of racks adapted to engage the peripheries of said wheels, respectively, a series of rails upon which said racks reciprocate, a series of pin frames connected with said racks, a series of pins mounted in each of said pin frames; a series of bars in connection with which said frames reciprocate; and a carry mechanism for said adding wheels.

9. In an adding device adapted to be connected to a typewriting machine; a nest comprising a series of adding wheels; a series of racks adapted to engage the peripheries of said wheels, respectively; a series of rails in connection with which said racks reciprocate; a series of pin frames connected with said racks; a series of pins mounted in each of said pin frames; a series of bars in connection with which said frames reciprocate; a carry mechanism for said adding wheels, and means for moving said nest transversely across the machine.

10. In a device adapted to be connected with a typewriting machine having key levers and a carriage; a series of levers adapted to engage with the numeral key levers of the typewriting machine; said levers suitably mounted and each connected with a driver; a means for mounting said drivers so that they shall extend transversely across the machine; a carriage; and means for connecting said carriage with the typewriting machine carriage; a series of pins conveyed by said carriage, adapted to be operated upon by said drivers, respectively; a means for breaking connection between said levers and typewriter key levers, substantially as described.

11. In a device adapted to be connected with a typewriting machine having a carriage; a second carriage; a means for connecting the same with the second carriage of a typewriting machine; said carriage conveying a series of pins; with a means on each pin for returning it to normal position after having been operated upon; a series of drivers mounted to extend transversely across the machine; a means for operating said drivers by the action of the numeral keys of a typewriting machine; a series of adding wheels mounted in a nest; a series of racks adapted to engage the peripheries of said adding wheels; a series of pin frames connected with said racks; a box or nest mounted in the rear of the machine; a series of frames, each carrying a denominational stop engaging with openings in said box or nest; keys attached to said frames, respectively, in the front of the machine, when acted upon causing said denominational stops to protrude within the path of the movement of said second carriage, whereby the extent of movement of said second carriage is determined.

12. In a device adapted to be connected to a typewriting machine having a carriage and tabulator keys; a nest or box mounted in the rear of the machine; a series of frames extending around the machine; a series of denominational stops engaging openings in said nest; keys attached to said frames, whereby said stops may be caused to protrude from said nest; a carriage; a means for connecting the same with the typewriting machine carriage; each of said frames connected with the tabulator key of a typewriting machine, in such a manner that by acting upon the frame key setting one of the denominational stops the typewriter carriage will be liberated and the adding machine carriage will move until it is stopped by the denominational stop, projected from said nest, substantially as described.

13. In an adding device adapted to be connected to a typewriting machine, a plurality of nests; said nests comprising a series of adding wheels; a series of racks adapted to engage and disengage said adding wheels, respectively; a means for determining the extent of motion of said wheels; a means for moving each of said nests transversely across the machine; a means for restoring the adding wheels in each of said nests independently or collectively to zero, substantially as described.

14. In an adding device adapted to be connected to a typewriting machine; a nest comprising a series of adding wheels; a series of racks adapted to engage therewith; a series of pin frames; a series of links adapted to connect said racks with said pin frames, respectively; a series of pins in each of said pin frames; a series of friction springs mounted on said pins; a "carry" device operated in connection with said adding wheels; a means for restoring said adding wheels to zero; a means for moving said nests transversely across the machine, all substantially as described.

15. In an adding device adapted to be connected to a typewriting machine; an adding machine carriage; a series of adding wheels; a means for rotating said adding wheels; means for returning said adding wheels to zero position; a tabulator comprising a nest mounted in the rear of the machine; a series of frames mounted around the sides and front of said machine; a series of keys attached to said frames; a series of denominational stops attached to said frames and engaging openings in said nests; a rolling tabulator stop mounted on the adding machine carriage adapted to engage said denominational stops; a spindle extending transversely of the machine; springs mounted thereon; a means for connecting said springs with said frames, substantially as described.

16. In an adding device adapted to be connected to a typewriting machine having a tabulator key; the combination of a nest comprising a series of adding wheels; a means for imparting rotative motion to said adding wheels; and a tabulator nest mounted at the rear thereof; with a carriage adapted to move transversely across the machine above said nests; a means conveyed by said carriage adapted to operate said adding wheels and determine the extent of their rotation, respectively; a series of tabulator frames; a series of denominational stops attached thereto and adapted to engage with said tabulator nests; a means for connecting said frames with the tabulator key of a typewriting machine; a means for releasing the adding machine carriage, whereby when the tabulator key of the typewriting machine is depressed said typewriter carriage and the adding machine carriage will be released, simultaneously, and one of the denominational stops projected in the path of said adding machine carriage, whereby the adding machine carriage and typewriter carriage will be stopped in their motion by the denominational stop engaging the adding machine carriage, substantially as described.

17. In an adding device adapted to be connected to a typewriting machine; a series of adding wheels; a means for imparting rotative motion thereto; a series of pin frames connected therewith; an adding machine carriage adapted to reciprocate transversely across the machine; a means in said carriage for restoring a pin erroneously depressed.

18. In an adding device adapted to be connected to a typewriting machine; a series of adding wheels; a series of racks adapted to engage therewith, respectively; a series of pin frames; a series of pins in each of said frames; a pin frame drive bar extending across the machine, adapted to engage the pins projected from said pin frames; a pin frame return bar extending across said machine forward of said pin frames, adapted to return the pin frames to their normal position; a bar extending across the machine; a means for causing said last mentioned bar to be depressed when said adding wheels are rotated; a means for raising said last mentioned bar into the path of the pins projecting from said pin frame and restoring said pins in said frame thereby when the racks, aforesaid, are returned to their normal position, substantially as described.

19. In an adding device adapted to be connected to a typewriting machine; a series of adding wheels suitably mounted; a reciprocating means for imparting rotary motion to said adding wheels; a carriage adapted to move transversely across the machine; a series of drivers; a means for operating said drivers; a means for causing said drivers to make connection with said carriage at certain predetermined positions of the carriage; a "carry" device comprising a means for locking said adding wheels and holding the same locked, except when a "carry" is to be made; with a means on the return movement of said reciprocating device for releasing said locking means when one of the wheels has rotated a certain specified degree and causing the next wheel to the left to rotate one space.

20. In an adding device adapted to be connected to a typewriting machine; a series of adding wheels, suitably mounted; a means for rotating said wheels; a locking point adapted to engage said adding wheels; a latch; a means for securing said locking point in engagement with said latch; a means on said adding wheels for engaging said latch, whereby the connection between said locking point and said latch is broken; with a means for causing said locking point to rotate the adding wheel with which it is engaged one space, when engagement between said latch and said locking point is broken, as aforesaid; a carriage adapted to move transversely across the machine; a series of drivers; a means for operating said drivers; a means for causing said drivers to make connection with said carriage at certain predetermined positions of the carriage, substantially as described.

21. In an adding device adapted to be connected to a typewriting machine; a series of adding wheels mounted to rotate; a means for imparting rotary motion thereto; a series of locking points adapted to engage said adding wheels, respectively; a series of latches adapted to engage said locking points; a means for holding said locking points positively in connection with said adding wheels, respectively; a means for breaking connection between said locking point and said adding wheel before or after a carry has been made; a carriage adapted to move transversely across the machine; a series of drivers; a means for operating said drivers; a means for causing said drivers to make connection with said carriage at certain predetermined positions of the carriage, substantially as described.

22. In an adding device adapted to be connected to a typewriting machine; a series of adding wheels; means for mounting the same; a means for rotating said adding wheels, consisting of racks engaging the peripheries of said wheels, respectively; a driving frame; a gear; a pinion adapted to impart rotary motion to said gear; a key; a means adapted to be set in motion by the operation of said key for making connection between the driving frame and said gear.

23. In an adding device adapted to be operated independently of a typewriting machine; a series of adding wheels; a series of racks adapted to engage the peripheries of said adding wheels, respectively; each of said racks connected with a pin frame; a series of pins in each of said pin frames; a carriage adapted to move transversely of said machine above said pin frames; a series of pins in said carriage; a series of levers adapted to engage said pins in said carriage, which in turn engage certain predetermined pins in said pin frames; a rack extending transversely of the machine in the rear of said carriage; a means on said carriage for engaging said rack; a means for causing said engagement between said rack and said carriage to be broken, allowing said carriage to move from left to right one space of said rack at a time, by the operation of said levers; with a spring connected with said rack tending to draw said carriage from left to right; with a means for breaking connection between said rack and said carriage, whereby said carriage may be moved from right to left against the tension of said spring, substantially as described.

24. The combination with a typewriting machine having number-printing mechanism, number keys, each representative of a different digit, to operate the same, and a letter-spacing carriage, of a computing mechanism including computing wheels representative of different denominational orders, a variably settable computing wheel actuator for each of said computing wheels, a master setting device for said actuators, a movement-transmitting connection between said carriage and said master setting device, whereby on movement of the former the latter will be brought into coöperative setting relation with the different actuators in succession, an individual setting device controlled by each of said number keys for selectively effecting a setting operation of said master setting device characteristic of the digit represented by said key, so as to cause it to effect a corresponding setting of any actuator with which it may be in coöperative setting relation, and means for effecting movements of said actuators such as to rotate said computing wheels, the extent of such movements being determined by the settings of said actuators. a part of said computing mechanism, including said actuators, being variably settable at different points along the path of movement of said master setting device, so as to vary the zone of movement of the typewriter carriage at which numbers printed will be computed.

25. In an adding machine, movable parts, a shaft rotatable to control said parts, a segment on said shaft concentric with its axis of revolution, a flat section on said shaft, and a roller bearing at the edge of said flat section.

26. In an adding machine, pins controlling the movement of the parts, friction coil springs having an arcuate axis embracing said pins to hold them, and means for moving said pins in said springs.

27. The combination with a typewriter having number-printing mechanism, number keys, each representative of a different digit, to operate the same, and a letter-spacing carriage, of a computing mechanism including computing wheels and computing wheel actuators representative of each of a plurality of different denominational orders, each actuator having, as a connected part thereof, a plurality of settable movement-determining elements, each representative of a different one of said digits, a master setting device therefor comprising a single set of setting elements, each representative of a different one of said digits, a movement-transmitting connection between said carriage and said master setting device, whereby on movement of the former the setting elements of the latter will be brought into coöperative relation with the corresponding movement-determining elements of said actuators in succession, means controlled by each number key for operating the setting element corresponding with the digit represented by said key, the relation between the key-controlled operating devices and the setting elements being such as to preserve their mutual coöperative relation during the movement of the master setting device from actuator to actuator, means for effecting movements of said actuators so as to rotate said computing wheels, the extent of such movements being determined by the settings of said movement-determining elements, means for returning said actuators to their normal positions, and means, operated by said returning means, for concomitantly resetting said movement-determining elements to their normal ineffective condition.

28. In an adding machine, adding wheels, keys, racks whose motion is limited by the operation of said keys, a shaft extending near said adding wheels on which said racks slide, a rounded section on said shaft holding said racks in mesh with said wheels, means for moving said racks to carry into the adding wheels the numbers represented by the operated keys, a flat side on said shaft on which said racks rest on their return stroke out of mesh with said wheels, and means for reciprocating said racks.

29. In an adding machine, adding wheels, keys, racks whose motion is limited by the operation of said keys, a shaft extending near said adding wheels on which said racks slide, a rounded section on said shaft holding said racks in mesh with said wheels, means for moving said racks to carry into the adding wheels the numbers represented by the operated keys, a flat side on said shaft on which said racks rest on their return stroke out of mesh with said wheels, means for locking said wheels, and means for reciprocating said racks.

30. In a combined typewriting and computing machine, the combination with reciprocating racks, of keys for limiting the movement of said racks, wheels with which said racks mesh, a frame for moving said racks, a hook on each side and a spring on one side of said frame for operating it.

31. In an adding machine, the combination of a carriage, rack frames parallel with said carriage, a row of pins on each of said frames, a single corresponding row of pins on the carriage, means for giving said carriage a letter space movement from left to right bringing it successively over each of said frames, so that the frame pins register with the carriage pins, drivers, one for each carriage pin, extending completely over the pathway of each pin in the carriage, keys for depressing said drivers to depress said carriage pins to depress said rack pins, means restoring said carriage pins, means holding said rack pins wherever set, means for restoring said rack pins, and other means for restoring said rack pins by the movement of the carriage.

32. In an adding machine, the combination of adding wheels, racks engaging said wheels, pins on said racks, means for depressing said pins to govern the movement of said racks, a reciprocating member, inclined planes on said member, a bar extending across said reciprocating member and resting on said inclined planes, and means causing said bar to ride at the foot of said inclined planes in one direction of movement of said reciprocating member and causing said bar to ride up on said inclined planes when moved in the opposite direction, and to intercept and raise said pins to normal position.

33. In an adding machine, the combination of adding wheels, racks engaging said wheels, pins on said racks, means for depressing said pins to govern the movement of said racks, a reciprocating member adapted to strike said pins and carry forward said racks, inclined planes on said member, a bar extending across said member and resting on said inclined planes so as to clear said pins when struck by said member, and means to cause said bar to rise on said inclined planes on the reverse stroke of said reciprocating member and to restore said pins to normal position.

34. In an adding machine, the combination of adding wheels, racks engaging said wheels, pins on said racks, means for depressing said pins to govern the movement of said racks, a reciprocating member comprising side bars, a cross bar connecting said side bars arranged to strike said pins and drive forward said racks, abutments on said racks, a second cross bar in said reciprocating member arranged to strike said abutments on the return stroke and return the racks to normal positions, inclined planes on said side bars, a pin returning bar riding on said inclined planes and arranged to clear said pins when struck by said first cross bar but riding up on the return stroke to strike said pins and restore them to normal.

35. In an adding machine, the combination with adding wheels, of reciprocating racks engaging said wheels, pins on said racks for moving said racks, means for moving said pins on said racks to determine the rotation of said adding wheels, a reciprocating member for striking said pins, rack bars on said reciprocating member, and gears working in said rack bars to operate a positive locking mechanism for said adding wheels.

36. In an adding machine, the combination with adding wheels, of reciprocating racks engaging said wheels, pins on said racks for moving said racks, means for moving said pins on said racks to determine the rotation of said adding wheels, a reciprocating member for striking said pins, a rotatable shaft supporting said racks, a curved surface on said shaft holding the racks in mesh with the adding wheels, a cut away portion on said shaft permitting said racks to clear said adding wheels, and means on said shaft to engage with said reciprocating member to rotate said shaft to engage said racks with said adding wheels on one motion and to rotate said shaft to withdraw said racks from said wheels on the reverse motion.

37. In an adding machine, adding wheels, racks meshing with said wheels, pin frames moving said racks, guides on said pin frames moving in fixed guides, means for raising and lowering said racks, and a pivot connection between said racks and said pin frames.

38. In an adding machine, adding wheels, racks meshing with said wheels, pin frames moving said racks, guides on said pin frames moving in fixed guides, means for raising and lowering said racks, a guide plate in which said racks move, means for raising and lowering said guide plate, and pivoted link connections between said frames and said racks.

39. In an adding machine, pin frames, means for displacing pins in said frames, a reciprocating bar moving said frames by said pins, a reciprocating frame, openings in said reciprocating frame in which said bar rests, a second bar arm pivoted to said first bar, and an inclined plane on said reciprocating frame arranged to cause said second bar to ride up under said pins when said reciprocating frame is moved in one direction, and arranged to let said second bar clear said pins in the reverse direction.

40. In a combined typewriting and adding machine, means connecting typewriter keys with adding mechanism, a typewriter carriage, a tabulating device therefor, an adding machine carriage moving step-by-step therewith in the reverse direction, nests of adding wheels, means for setting said nests, a tabulating device governing the adding machine carriage with reference to each nest, and means disabling said setting when said connection of keys with adding mechanism is broken.

41. In a combined typewriting and adding machine, typewriter keys, depending links extending to the adding mechanism, a shaft extending across the machine, bell cranks rocking on said shaft, links extending from said bell cranks, pins set by said links, and adding wheels governed by said pins.

42. The combination with a typewriting machine having number-printing mechanism, number keys, each representative of a different digit, to operate the same, and a letter-spacing carriage, of a computing mechanism including computing wheels representative of different denominational orders, a variably settable computing wheel actuator for each of said computing wheels, a master setting device for said actuators, a movement-transmitting connection between said carriage and said master setting device, whereby on movement of the former the latter will be brought into coöperative setting relation with the different actuators in succession, an individual setting device controlled by each of said number keys for selectively effecting a setting operation of said master setting device characteristic of the digit represented by said key, so as to cause it to effect a corresponding setting of any actuator with which it may be in coöperative setting relation, means for effecting movements of said actuators so as to rotate said computing wheels, the extent of such movements being determined by the settings of said actuators, and means for automatically restoring said actuators to a normal ineffective state.

43. In a combined typewriting and adding machine, the combination with numeral keys, of an item register in which numbers are temporarily recorded, means operated by said keys for setting said item register, denominational wheels, locking means for said denominational wheels, power means for carrying into said wheels the numbers represented by said item register, and power means for unlocking said wheels.

44. In an adding machine, the combination with numeral keys, of pin frames, pins in said frames set by said keys, a reciprocating bar driving said frames by said set pins, a second bar traveling with said first bar in proximity to said set pins, and arranged on the reverse stroke of said first bar to rise and restore said pins to normal.

45. In a calculating machine, the combination with a total register, an item register having elements movable into and out of engagement with elements of the total register, and operating means for the item register, of automatic means for shifting the said elements of the item register into and out of engagement with the said elements of the total register.

46. In a calculating machine, the combination with a total register, and an item register having elements movable into engagement with elements of the total register to permit the transfer of an item value from the item register to the total register, of a lock to retain said elements in engaged relation during the transfer of an item, means for automatically releasing said elements from said lock upon the transfer of the item, and means for restoring the item to register to normal condition when released.

47. In a calculating machine, the combination with a total register, and an item register having elements movable into and out of engagement with elements of the total register, of means for holding said elements in engaged relation during the transfer of an item, and restoring mechanism for the item register, said restoring mechanism being coöperatively related to the holding means.

48. In a combined typewriting and calculating machine, the combination with a typewriter including printing mechanism, keys, and a movable carriage, of a total register, a movable item register, means controlled by the typewriter keys for setting up an item value in the item register, means for shifting elements of the item register into engagement with elements of the total register, means for moving elements of the item register for the purpose of transferring the item value to the total register, and for resetting the item register, and means for returning the item register to its normal position.

49. In a computing device, the combination with a series of denominational members, of means for operating a plurality of said members at the same time, said operating means being movable out of engagement with the members, transfer mechanism including a series of transfer selectors controlled by the denominational members, and means operated by the movement of the operating mechanism out of engagement with the denominational members, to bring the carrying mechanism into action.

50. In a computing device, the combination with a series of wheels, a series of carrying devices therefor, a series of wheel operated selectors for said carrying devices, of a transfer lock, operating mechanism movable into and out of engagement with the denominational members, and means movable with said operating mechanism to operate the transfer lock.

51. In a computing device, the combination with a series of denominational members and driving means therefor, of a series of carrying devices for the members, a transfer lock holding the carrying devices inactive, a series of selectors operated by the denominational members to determine which of the carrying devices shall operate when released by the transfer lock, and means operative to move the transfer lock and thus release the selected carrying devices.

52. In a calculating machine, the combination with a total register including a series of denominational members, carrying mechanism therefor, and automatic selectors for determining the denominational members to be operated by the carrying mechanism, of an item register arranged to operate the denominational members, means for effecting relative movement of the total and item registers to disengage the same, and means operative during such movement to bring the carrying mechanism of the total register into action.

53. In a calculating machine, the combination with a total register, including a series of denominational members, a series of carrying devices, and automatic selectors for the carrying devices, of an item register, means for setting up an item thereon, means for operating the item register to reset the same and to operate the total register, means for disconnecting the total and item registers, and means operative upon such disconnection to bring the carrying mechanism of the total register into action.

54. In a calculating machine, the combination with a total register including a series of denominational members, carrying mechanism therefor, and selecting mechanism operated during the movement of the denominational members to determine which of said members shall be subsequently advanced by the carrying mechanism, of an item register, means for setting up an item thereon, and a motor operative to reset the item register and to cause the latter to operate the denominational members of the total register, and means controlled by the motor and adapted to bring the carrying mechanism of the total register into action at the proper time.

55. In a combined typewriting and calculating machine, the combination with a type writer including printing mechanism, keys, and a movable carriage, of an item register, key controlled means for setting up an item on the item register, a total register including a series of denominational members, carrying mechanism therefor, selecting mechanism for determining which of the denominational members shall be operated by the carrying mechanism, means for operating the denominationl members of the total register to transfer an item value thereto, and means controlled by the item transferring means and operative subsequent to the operation of said members to bring the carrying mechanism into action.

56. The combination with a typewriter including numeral keys, printing mechanism, and a carriage movable to permit numbers to be printed in a column or adding field and also at opposite sides of said field, an item register disconnected from the keys during the printing of numerals outside of the adding field, means whereby a coöperative relation will be established between the keys and item register when the adding field is reached, a total register, and means for causing item values to be transferred to the total register from the item register.

57. The combination with a typewriter including printing mechanism and a carriage, said carriage being movable to permit items to be printed in any one of several columns or adding fields, of an item register adapted to register the items printed in any selected column or field, keys for operating the item register, means for automatically establishing a coöperative relation between the keys and the item register when the selected adding field is reached, a total register, and means for transferring item values thereto from the item register.

58. The combination with a typewriter including a carriage, numeral keys, and printing mechanism, of an item register including a series of denominational members, a master actuator operated by the keys to cause the registration of an item on the item register simultaneously with the printing of said item by the printing mechanism of the typewriter, the denominational relation of the item register and its actuator being controlled by the typewriter carriage, and a total register coöperatively related to the item register.

59. The combination with a typewriter including a frame, a carriage, keys, and printing mechanism, of an item register laterally adjustable to different column positions, operating mechanism for the item register, a total register, and means for causing the transference of item values to the total register from the item register.

60. The combination with a typewriter including a carriage, carriage propelling mechanism, keys, and printing mechanism, of an item register including a series of denominational members and adjustable on the typewriter to different column positions, a master actuator for the item register, said register and actuator being relatively movable by the carriage propelling mechanism to change their denominational relation, means for operating the actuator, a total register, and means for causing item values to be transferred to the total register from the item register.

61. The combination with a typewriter including a carriage, carriage propelling mechanism, keys, and printing mechanism, of an item register including a series of denominational members and adjustable on the typewriter to different column positions, a master actuator, the item register and actuator being relatively movable by the carriage propelling mechanism to change their denominational relation, means operated by the numeral keys of the typewriter to operate the master actuator to set up an item on the register simultaneously with the printing of said item, a total register, and means for causing the transference of item values to the total register from the item register.

62. The combination with a typewriter including a frame and a movable carriage, of an item register and a total register, both mounted on the typewriter and relatively movable into and out of coöperative relation, and operating means for the item register, the movement of the typewriter carriage serving to change the denominational relation of the item register and its operating means.

63. In a combined typewriting and calculating machine, the combination with a typewriter including printing mechanism and keys, of a total register, and an item register normally disposed for operation by the keys of the typewriter to register an item recorded by the printing mechanism and movable from its normal position to engage and operate the total register for the purpose of transferring the item value thereto.

64. In a computing device, the combination with a series of denominational members, a series of actuating elements therefor, a series of transfer members for said denominational members, a series of swinging selectors each normally retaining a transfer member but movable to an inoperative position by a denominational member, and means for yieldingly retaining the selectors at either limit of their movement, of means operative subsequent to the operation of a plurality of selectors to operate the selected transfer members.

65. In a computing device, the combination with a series of denominational members, a series of actuators therefor, of a series of transfer members for said denominational members, a series of selectors each disposed normally to retain a transfer member and arranged to be moved to an inoperative position by a denominational member, means for yieldingly retaining the selectors in either their normal or inoperative positions, means for holding the transfer members when released by the selectors, and means operative upon the movement of said holding means to operate the selected transfer members.

66. In a computing device, the combination with a series of denominational members, of a series of transfer members, selectors normally retaining the transfer members, but movable to inoperative positions by the denominational members, and a transfer lock controlling the operation of the selected transfer members and also controlling the operative relation between the transfer members and the denominational members.

67. In a computing device, the combination with a series of denominational members, of carrying devices therefor, a transfer lock for the carrying devices, selectors operated by the denominational members to determine which of the carrying devices shall set when released from the transfer lock, said transfer lock being common to all of the carrying devices and controlling the coöperative relation between said carrying devices and the denominational members.

68. In a computing device, the combination with a series of wheels, of a series of transfer levers, transfer dogs carried by the levers and movable into engagement with the wheels, a series of wheel operated selectors for determining which of the transfer levers shall operate, and a transfer lock controlling the operation of the selected levers and movable to release said levers and to move the transfer dogs into engagement with the wheels.

69. In a computing device, the combination with a series of wheels, of a series of spring actuated transfer levers therefor, transfer dogs movably mounted on the levers, a series of wheel operated selectors movable to determine which of the transfer levers shall operate, and a transfer lock common to the transfer levers and movable to release said levers and to move the transfer dogs into engagement with the wheels.

70. In a computing device, the combination with a series of denominational members, of a series of transfer members therefor, a separate motor for each transfer member, a transfer lock common to the several transfer members, a selector for each transfer member, means whereby the selectors will be controlled by the denominational members, a motor for operating the denominational members, and means for disconnecting the motor from the denominational members and for operating the transfer lock to release the selected transfer members.

71. The combination with a total register including a series of denominational members and carrying mechanism therefor, of an item register including a series of denominational members, means for setting up an item on the item register, a transfer motor, means for operatively connecting the total and item registers and for releasing the motor to transfer the item value to the total register, means for disconnecting the item and total registers, and means operative upon such disconnection to bring the carrying mechanism of the total register into action.

72. In a calculating machine, the combination with a total register including a series of denominational members, carrying mechanism therefor, and selectors operated by the denominational members to determine which of said members shall be operated by the carrying mechanism, of an item register, means for setting up an item on the item register, means operative to reset the item register and to cause said item register to operate the denominational members of the total register, and automatic means for bringing the carrying mechanism into action after the item register has been reset.

73. In a combined typewriting and calculating machine, the combination with a typewriter including printing mechanism, keys, and a movable carriage, of an item register, means for setting up an item on the item register as said item is recorded by the printing mechanism of the typewriter, a total register, spring operated carrying mechanism for the total register, means for operating the total register from the item register, and means restraining the action of the carrying mechanism until after the denominational members of the total register have been operated.

74. In a combined typewriting and adding machine, the combination with a traveling carriage, of a nest of adding wheels relatively to which said carriage travels, said nest shiftable along the path of said carriage, a rack bar and lock for holding said nest in position, means for releasing said lock, and a rack and pinion for moving said nest.

75. In a combined typewriting and calculating machine, the combination with a typewriter including a frame, a traveling carriage, and printing mechanism and keys to print on the carriage as it moves, of a computing device adjustable on the frame of the typewriter and including an item register and a total register, means for causing the item register to register items recorded by the printing mechanism, means to transfer an item value to the total register, means for resetting the item register, and a denomination selector moving step-by-step with the carriage.

76. In a combined typewriting and calculating machine, the combination with a typewriter including printing mechanism and keys, of a total register, an item register normally disposed for operation by the keys of the typewriter to register an item recorded by the printing mechanism and comprising parts movable into engagement with said total register to carry into said total register items recorded by the keys.

77. In a combined typewriting and calculating machine, the combination with a typewriter including printing mechanism, keys, and a movable carriage, of a master actuator arranged to be advanced laterally by the carriage and having its digit control parts actuated by the typewriter keys, an item register mounted independently of the carriage to be shifted to operate in selected columns, and including a series of denominational members successively engaged by the master actuator, a total register, and means for effecting the transfer of an item value from the item register to the total register.

78. In a combined typewriting and calculating machine, the combination with a carriage, keys printing on said carriage, an item register including a series of denominational members, a denominational selector moving with said carriage to carry numbers printed into said item register, a total register, and a motor carrying a number simultaneously from all said members into said total register, and resetting said item register.

79. In a computing machine, a shaft, a computing wheel loose on said shaft, a collar on said wheel, a lug on said collar, a pin loose in an opening in said shaft arranged to intercept said lug, and an opening in said collar allowing said pin to pass said lug.

80. In a computing machine, a shaft, a computing wheel loose on said shaft, a collar on said wheel, a pin loose in an opening in said shaft arranged to strike a lug on said collar, an opening in said collar opposite said lug, an extension on said lug forming a cam to throw said pin away from said collar, and a cam formed on one edge of the opening to throw said pin toward said lug.

81. In a computing machine, a shaft supported in a frame, computing wheels loose on said shaft, means to cause said wheels to revolve at will with said shaft, a shaft extending across the machine, a gear slidably splined on said second shaft, a gear fixed on said first shaft, means to turn said first shaft, and means to move said slidable gears into and out of mesh with said fixed gears.

82. In a combined typewriting and computing machine, a tabulating device comprising a carriage, a frame on which the carriage travels, a movable nest, a tabular stop in said nest, a key on the frame operating said stop and a coöperating stop on the carriage.

83. In a combined typewriting and computing machine, a tabulating device comprising a carriage, a frame on which the carriage travels, a movable nest, a tabular stop in said nest, a bar parallel to the travel of said nest, an arm on said stop engaging said bar, a coöperating stop on the carriage, and a key moving said bar to govern said stop.

84. In a combined typewriting and computing machine, a tabulating device comprising a carriage, a frame on which the carriage travels, a roller on the carriage, and stops arranged to be projected into the path of the roller to stop the carriage.

85. In a combined typewriting and computing machine, a tabulating device comprising a carriage, a frame on which the carriage travels, a movable nest, a tabular stop moving in the nest, a key on the frame operating said stop, and a roller on the carriage arranged to be intercepted by the stop to arrest the carriage.

86. In a combined typewriting and computing machine, a tabulating device comprising a carriage, a frame on which the carriage travels, a movable nest, a tabular stop in said nest, a bar parallel to the travel of said nest, an arm on said stop engaging said bar, a roller on the carriage arranged to be intercepted by said stop to arrest the carriage, and a key on the frame to project said stop into the path of said roller.

87. In a combined typewriting and computing machine, a tabulating device comprising a carriage, parallel plates on the carriage, a stop extending through said plates and alined by openings therein, a bar parallel to the travel of the carriage, a member on the stop embracing said bar, and a key moving said bar to govern said stop.

88. In a combined typewriting and computing machine, a tabulating device comprising a carriage, a frame on which the carriage travels, a slidable nest of adding mechanism, interengaging stops carried by said carriage and said nest, a shaft parallel to the direction of travel of the carriage, an arm slidably splined on said shaft and mounted for movement with said nest, and a rack bar into and out of engagement with which said arm may be moved by forward and backward movement of said shaft to lock and unlock said nest.

89. In a combined typewriting and computing machine, a tabulating device comprising a nest of adding mechanism, means for setting said nest, and a denominational tabulator mounted in said nest.

90. In a combined typewriting and computing machine, a tabulating device comprising a carriage, a nest of adding wheels, means for moving said nest, a rack bar, stops sliding with said nest and engaging in said rack bar to lock said nest, a bar parallel to said rack bar, a stop to arrest said carriage in said nest engaging and sliding on said bar, and a key moving said bar.

91. In a combined typewriting and computing machine, a tabulating device comprising a traveling nest, bars parallel to the line of travel of said nest, stops movable by said bars at right angles to said line of travel, a carriage, a roller on the carriage arranged to be intercepted by said stops to arrest the carriage, and means for shifting and locking said nest.

92. In a combined typewriting and computing machine, the combination with a traveling carriage, of a shiftable computing mechanism covering part of the travel of said carriage, fixed denominational tabulator keys, and a denominational tabulator shifting automatically with the shifting of the computing zone.

93. In a combined typewriting and computing machine, a tabulating device comprising a carriage, a frame on which the carriage travels, a movable nest, a tabular stop in said nest, a bar parallel to the travel of said nest, a pocket on said stop embracing said bar, a coöperating stop on the carriage, and a key moving said bar to govern said stop.

94. In a combined typewriting and computing machine, in combination, a typewriter having a printing mechanism including a letter-spacing carriage, a computing mechanism including computing wheels and actuators therefor representative of each of a plurality of different denominational orders, denomination - selecting mechanism controlled by said carriage for selectively effecting a coöperative relation between said printing mechanism and the actuators of different denominational orders in succession, a part of said computing mechanism, including said actuators, being variably settable at different points along the path of movement of said denomination-selecting mechanism, so as to vary the zone of movement of the typewriter carriage at which numbers printed will be computed, a letter-space scale for said typewriter, and a similar scale for said computing mechanism, the relation of all said elements being such that when said computing mechanism is so set as to bring the computing wheel of any denominational order in register with any letter-space indication of the scale associated therewith, and the typewriter carriage is advanced to the same letter-space position, as indicated on the typewriter scale, the denomination-selecting mechanism will effect a coöperative relation between the typewriter printing mechanism and the actuator of said computing wheel.

95. The combination with a typewriting machine having number - printing mechanism, number keys, each representative of a different digit, to operate the same, and a letter-spacing carriage, of a computing mechanism including computing wheels representative of different denominational orders, a variably settable computing wheel actuator for each of said computing wheels, a master setting device for said actuators, a movement - transmitting connection between said carriage and said master setting device, whereby on movement of the former the latter will be brought into coöperative setting relation with the different actuators in succession, an individual setting device controlled by each of said number keys for selectively effecting a setting operation of said master setting device characteristic of the digit represented by said key, so as to cause it to effect a corresponding setting of any actuator with which it may be in coöperative setting relation, means for effecting movements of said actuators so as to rotate said computing wheels, the extent of such movements being determined by the settings of said actuators, a part of said computing mechanism, including said actuators, being movable to different positions along the path of the movement of said master setting device, so as to vary the zone of movement of the typewriter carriage at which numbers printed will be computed, and means for locking said movable part in any one of said positions, the different positions as determined by said locking means being such that said actuators will be in register with positions assumed by said master setting device when said typewriter carriage is in letter-spacing positions.

96. In a combined typewriting and computing machine, in combination, a typewriter having printing mechanism including a letter-spacing carriage, a computing mechanism including computing wheels and actuators therefor representative of each of a plurality of different denominational orders, denomination-selecting mechanism controlled by said carriage for selectively effecting a coöperative relation between said printing mechanism and the actuators of different denominational orders in succession, a part of said computing mechanism, including said actuators, being variably settable at different points along the path of movement of said denomination-selecting mechanism, so as to vary the zone of movement of the typewriter carriage at which numbers printed will be computed, a letter-space scale for said typewriter, a similar scale for said computing mechanism, and an index, settable at different letter-space positions along said computing mechanism scale, the relation of all said elements being such that, when said computing mechanism is so set as to bring the computing wheel of any denominational order in register with said index, and the typewriter carriage is advanced to the letter-space position of the typewriter scale corresponding to the letter-space of the computing mechanism scale in register with the index, the denomination-selecting mechanism will effect a coöperative relation between the printing mechanism of the typewriter and the actuator of said computing wheel.

97. The combination with a typewriter including a carriage, carriage-propelling mechanism, keys and printing mechanism, of an item register including a series of denominational members, adjustable means whereby the register is effective at different positions in the travel of the typewriter carriage, a denomination selector for the item register, said register and selector being relatively operable by the carriage-propelling mechanism to change their denominational relation, means whereby the keys are effective as determined by the selector on the item register, a total register, and means for causing item values to be transferred to the total register from the item register.

In testimony whereof I have affixed my signature in presence of two witnesses.

CLARENCE R. MARTINEAU.

Witnesses:
 FREDERICK W. CAMERON;
 LOTTIE PRIOR.